United States Patent [19]

Yamada

[11] Patent Number: 5,406,386
[45] Date of Patent: Apr. 11, 1995

[54] IMAGE DATA TRANSMITTING/RECEIVING APPARATUS

[75] Inventor: Junji Yamada, Tokyo, Japan

[73] Assignee: Kabushiki Kaisha Toshiba, Kawasaki, Japan

[21] Appl. No.: 207,037

[22] Filed: Mar. 7, 1994

[30] Foreign Application Priority Data

Dec. 29, 1993 [JP] Japan .................................. 5-351323

[51] Int. Cl.⁶ .......................... H04N 1/32; H04N 1/23
[52] U.S. Cl. .................................... 358/406; 358/409;
   358/434; 358/442; 358/296; 358/300; 395/114
[58] Field of Search ............... 358/406, 434, 435, 436,
   358/437, 438, 439, 442, 409, 468, 296, 300;
   395/114

[56] References Cited

U.S. PATENT DOCUMENTS

| | | | |
|---|---|---|---|
| 4,290,085 | 9/1981 | Kolker | 358/409 |
| 4,691,237 | 9/1987 | Shimizu | 358/409 |
| 5,162,917 | 11/1992 | Sugishima | 358/296 |
| 5,283,662 | 2/1994 | Nakajima | 358/409 |

FOREIGN PATENT DOCUMENTS 51-46141 4/1976 Japan .

Primary Examiner—Scott A. Rogers
Attorney, Agent, or Firm—Foley & Lardner

[57] ABSTRACT

A video clock is supplied from the sync circuit of a controller. In response to this video clock, an external unit controller outputs image data supplied from a host unit. A delay amount between the video clock and the image data is determined by a phase correcting section, and the phase correcting section generates a corrected image area signal based on the delay amount. The delay amount of the video clock is corrected on the basis f the corrected image area signal. A printer engine forms an image on an image bearing member on a basis of the image data provided in response with the corrected video clock. In this manner, the video clock can be synchronized with the externally supplied image data with a simple arrangement without changing the video clock output to the external unit controller and adding a signal delay circuit.

14 Claims, 21 Drawing Sheets

| | OUTPUT VALUE FROM VIDEO CLOCK OUTPUT COUNTER 118b | | SETTING VALUE OF VCDC RESISTER 118a | | | CLOCK LEVEL OF VIDEO CLOCK |
|---|---|---|---|---|---|---|
| | QB | QA | DC | DB | DA | |
| RISE WITHOUT DELAY | 0 | 0 | 0 | 0 | 1 | L |
| FALL WITHOUT DELAY | 0 | 0 | 0 | 0 | 0 | H |
| RISE WITH 1-CLOCK DELAY | 0 | 1 | 0 | 1 | 1 | L |
| FALL WITH 1-CLOCK DELAY | 0 | 1 | 0 | 1 | 0 | H |
| RISE WITH 2-CLOCK DELAY | 1 | 0 | 1 | 0 | 1 | L |
| FALL WITH 2-CLOCK DELAY | 1 | 0 | 1 | 0 | 0 | H |
| RISE WITH 3-CLOCK DELAY | 1 | 1 | 1 | 1 | 1 | L |
| FALL WITH 3-CLOCK DELAY | 1 | 1 | 1 | 1 | 0 | H |

Fig.13

| CONSTITUENT ELEMENT | LOGIC VALUE | | | | | | | |
|---|---|---|---|---|---|---|---|---|
| 118a QA | 0 : TRAILING EDGE OF INTERNAL VIDEO CLOCK<br>1 : LEADING EDGE OF INTERNAL VIDEO CLOCK | | | | | | | |
| 118a QB | 0 | | 1 | | 0 | | 1 | |
| 118a QC | 0 | | 0 | | 1 | | 1 | |
| 111b | 0 | | 1 | | 0 | | 0 | |
| 111c | 0 | | 0 | | 1 | | 0 | |
| 111d | 0 | | 0 | | 0 | | 1 | |
| 113b | 1 | | 0 | | 0 | | 0 | |
| 111e | 0 | | 1 | | 0 | | 0 | |
| 111f | 0 | | 0 | | 1 | | 0 | |
| 111g | 0 | | 0 | | 0 | | 1 | |
| 111h | 1 | | 0 | | 0 | | 0 | |
| 112c | 1 | 0 | 1 | 0 | 1 | 0 | 1 | 0 |
| 119a D INPUT | 1 | 0 | 0 | 1 | 0 | 1 | 0 | 1 |
| | | | 1 | 0 | 1 | 0 | 1 | 0 |
| 119a Q OUTPUT | 0 | 1 | 1 | 0 | 0 | 1 | 0 | 1 |
| | 1 | 0 | | | 1 | 0 | 1 | 0 |
| 119b Q OUTPUT | 0 | 1 | 0 | 1 | 1 | 0 | 0 | 1 |
| | 1 | 0 | 1 | 0 | | | 1 | 0 |
| 119c Q OUTPUT | 0 | 1 | 0 | 1 | 0 | 1 | 1 | 0 |
| | 1 | 0 | 1 | 0 | 1 | 0 | | |
| | NO DELAY | | 1-CLOCK DELAY | | 2-CLOCK DELAY | | 3-CLOCK DELAY | |

CONCERNS ONLY IN THIS CASE (NOTE)

| 1 | 0 |
|---|---|
| 0 | 1 |
| 1 | 0 |

ALL CONDITIONS

Fig.15

IMAGE DATA TRANSMITTING/RECEIVING APPARATUS

BACKGROUND OF THE INVENTION

1. Field of the Invention

The present invention relates to an image data transmitting/receiving apparatus applied to an image forming apparatus of a type that receives, e.g., externally supplied image data by using an internally generated video clock.

2. Description of the Related Art

Recently, image forming apparatuses, e.g., laser printer units, are connected to various types of external output units (host units) to perform printing. Image data supplied from the host unit through a cable is input to a laser printer unit body through an external unit controller mounted to the laser printer unit.

When the laser printer unit starts an image forming operation, image data supplied from the host unit through the external controller is synchronized with a video clock generated in the controller of the laser printer unit, thereby forming the image. A video clock of this type is described in Japanese Laid-open Patent Publication (Kokai) No. 51-46141. More specifically, a video clock generated in the controller of a laser printer unit is supplied to an external unit controller. The external unit controller sends image data in response to the supplied video clock, so that the laser printer unit forms an image.

However, due to elements and the like in the external unit controller, the output timing of the image data is delayed from the video clock, and a phase difference occurs between the image data and the video clock. This phase difference differs from one external unit controller to another.

In order to eliminate the phase difference, video clocks generated in the controller are divided into those for outputting the image data by the external unit controller and those for forming an image by the laser printer unit. Synchronized adjustment of the image data is performed by changing the count of image-forming video clock output to the external unit controller or adding a signal adjusting section, e.g., a delay element, to the image data output section. However, it is cumbersome to change the image video clock count or to add the signal adjusting section, leading to an increase in cost.

SUMMARY OF THE INVENTION

Accordingly, it is an object of the invention to provide an image data transmitting/receiving apparatus that can synchronize an internal clock with externally supplied image data with a simple arrangement without changing the video clock count or adding a signal adjusting section.

In accordance with the present invention, the foregoing objects, among others, are achieved by providing an image data transmitting/receiving apparatus, comprising: means for generating a clock signal; first means for receiving the clock signal and for sending image data in response to the clock signal; means for determining a delay amount which occurs in the first means between receiving clock signal and sending the image data; means for generating a corrected image area signal based on the delay amount; and second means for receiving the clock signal, the image data sent by the first means and the corrected image area signal and for outputting the image data in synchronism with the clock signal.

BRIEF DESCRIPTION OF THE DRAWINGS

A more complete appreciation of the present invention and many of the attendant advantages thereof will be readily obtained as the invention becomes better understood by reference to the following detailed description, when considered in connection with the accompanying drawings, wherein:

FIG. 13 is an operation logic table of the respective circuit constituent elements of the phase correcting section;

FIG. 15 is an operation logic table of the respective circuit constituent elements of the phase correcting section;

DETAILED DESCRIPTION OF THE PREFERRED EMBODIMENT

Figure 1:
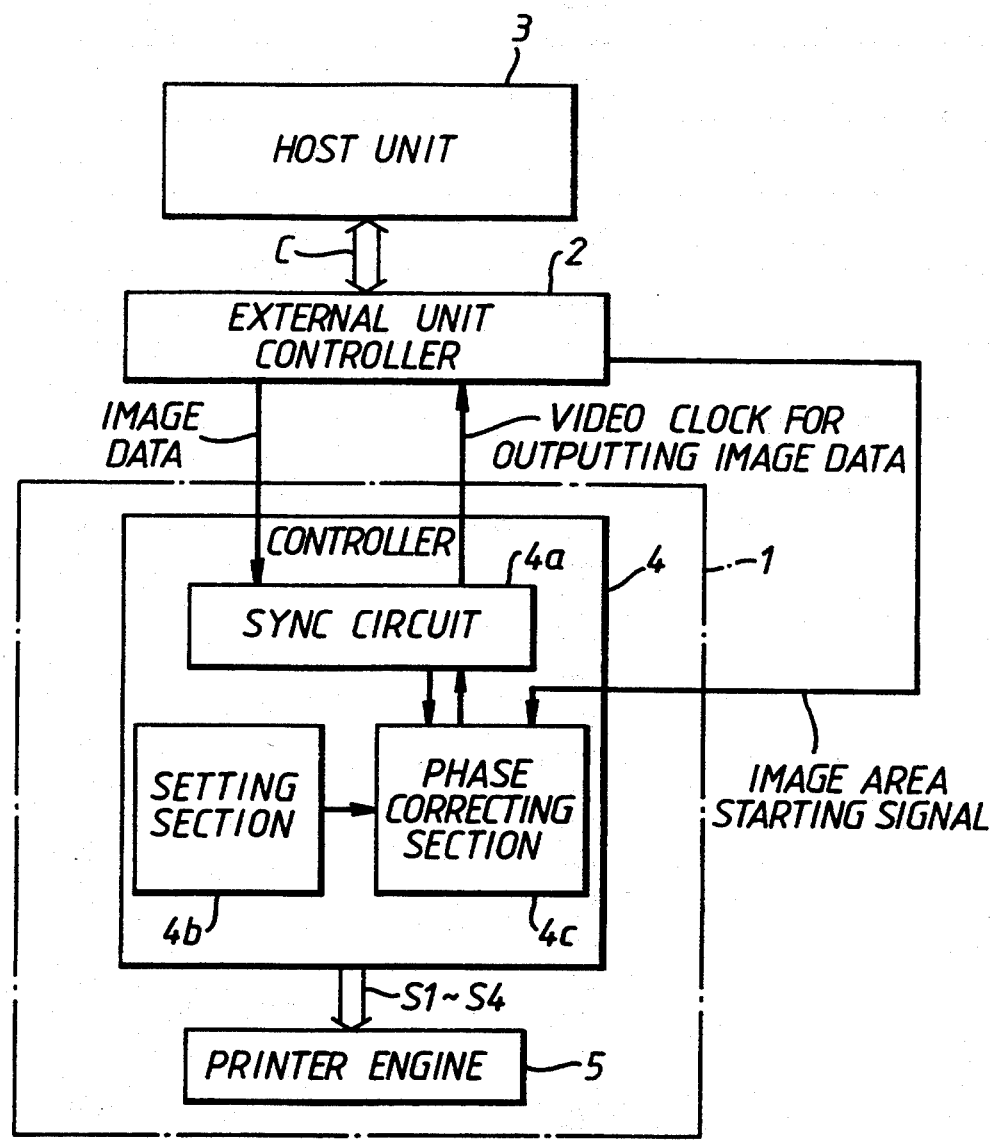
FIG. 1 is a block diagram schematically showing the arrangement of the entire system of a first embodiment of the present invention.
Figure 2:
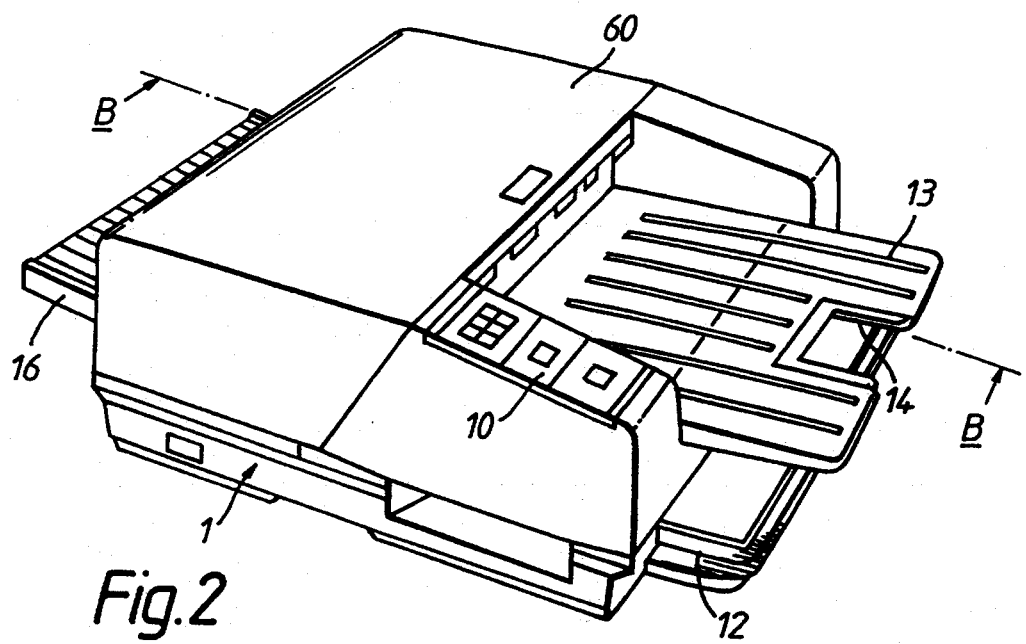
FIG. 2 is a perspective view showing the outer appearance of a laser printer of FIG. 1.
Figure 5:
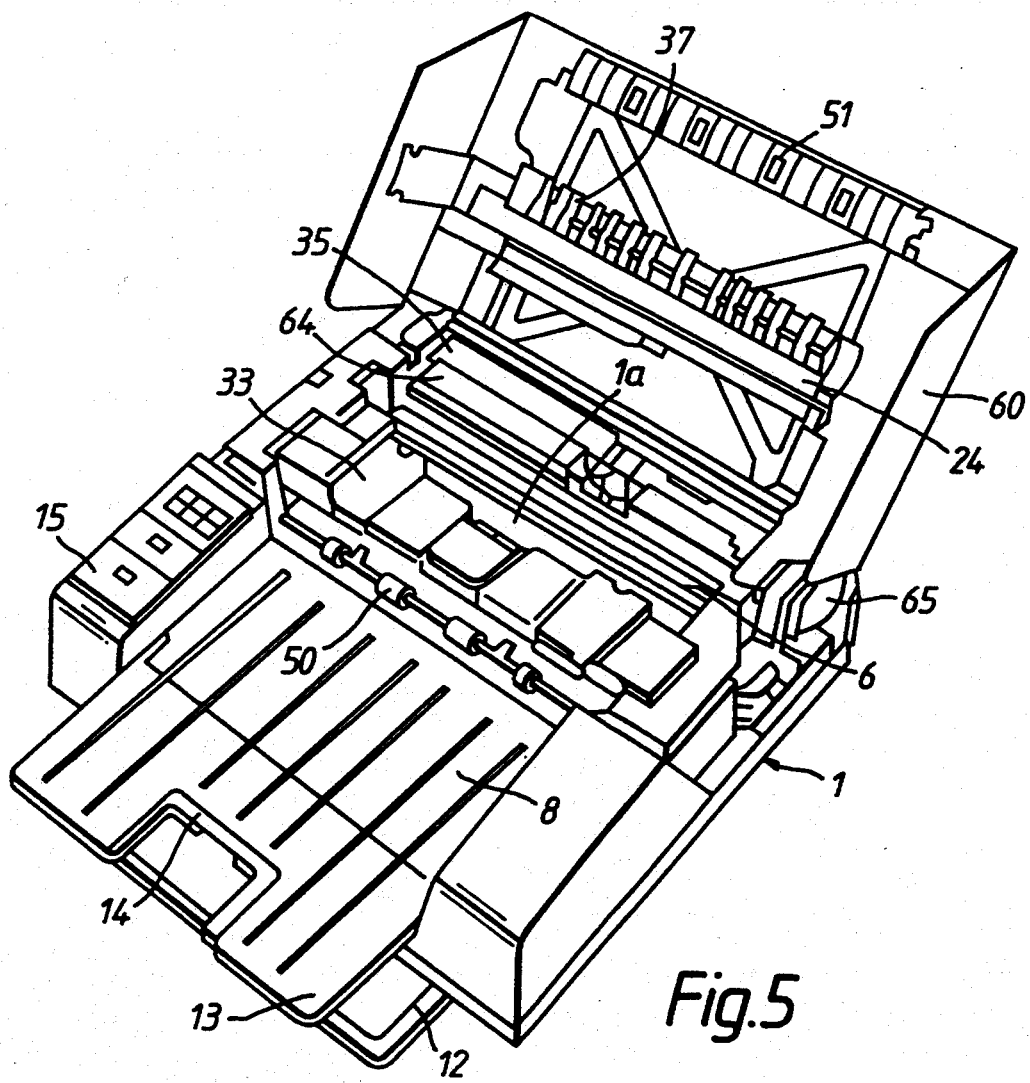
FIG. 5 is a perspective view showing the laser printer of FIG. 1.

FIG. 1 shows the arrangement of the entire system using an image forming apparatus, e.g., a laser printer unit, having an image data transmitting/receiving apparatus according to the present invention.

This system includes a laser printer 1, a external unit controller 2, and a host unit 3 serving as an external output unit, e.g., a computer or a wordprocessor.

Host unit 3 is connected to external unit controller 2 through a cable C. External unit controller 2 is connected to laser printer 1 through an external unit interface connecter (not shown). Laser printer 1 includes a controller 4 for controlling the entire system, and a printer engine 5 having respective sections to be described later.

Laser printer 1 is coupled to host unit 3 through external unit controller 2. Upon reception of a print start signal from host unit 3, laser printer 1 starts an image forming operation, records an image on a recording sheet based on image data supplied from host unit 3, and outputs the recording sheet.

Laser printer 1 will be described with reference to FIGS. 2 to 5. More specifically, laser printer 1 has an open section 1a on the upper surface. Controller 4 is arranged at the central portion in laser printer 1. An electrophotography process unit 6 for forming an image is arranged behind (on the right side in FIG. 3) controller 4. A control board storing section 7 for storing a plurality of function adding external unit controllers 2 is formed in the lower front portion of laser printer 1, and a paper discharge section 8 for discharging an image-forming sheet is formed in the upper front portion of laser printer 1.

A maximum of three function adding control boards 2 can be mounted in accordance with the degree of function addition (e.g., when the numbers of type faces or Chinese characters are to be increased). A plurality of (e.g., three) IC card connectors 9 are disposed at the front end portion of function adding control board 2 located at the lowermost stage of control board storing section 7. A new function of laser printer 1 can be adding by inserting a IC card 10 serving as a memory medium in the corresponding IC card connector 9.

IC card 10 includes a non-volatile memory, e.g., a static RAM having a battery backup, an EEPROM, an EPROM, or a mask ROM. For example, character fonts, an emulation program, and the like are stored in IC card 10.

Two interfaces are disposed on the left end face portion of the function adding external unit controller 2 located on the lowermost stage of control board storing section 7. These interfaces oppose the opening of laser printer 1 (neither are shown).

The loner portion of the interior of laser printer 1 forms a cassette storing section 11 for storing a paper feed cassette 12 capable of storing a large number of recording sheets P. Paper feed cassette 12 is mounted by being inserted in cassette storing section 11 from the lower front face portion thereof, and can be mounted and detached in a direction indicated by a double-headed arrow in FIG. 3.

Figure 3:
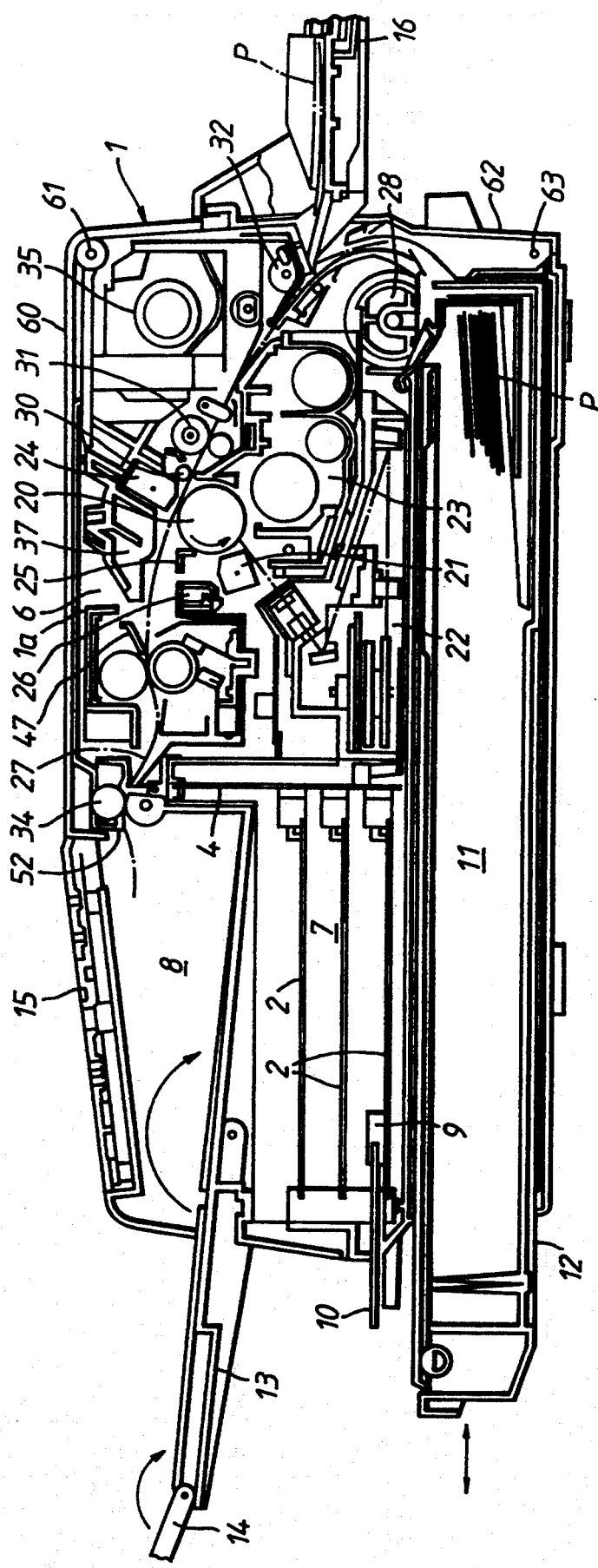
FIG. 3 is a sectional view along section line B—B in FIG. 2, showing the arrangement of the laser printer of FIG. 1.
Figure 4:
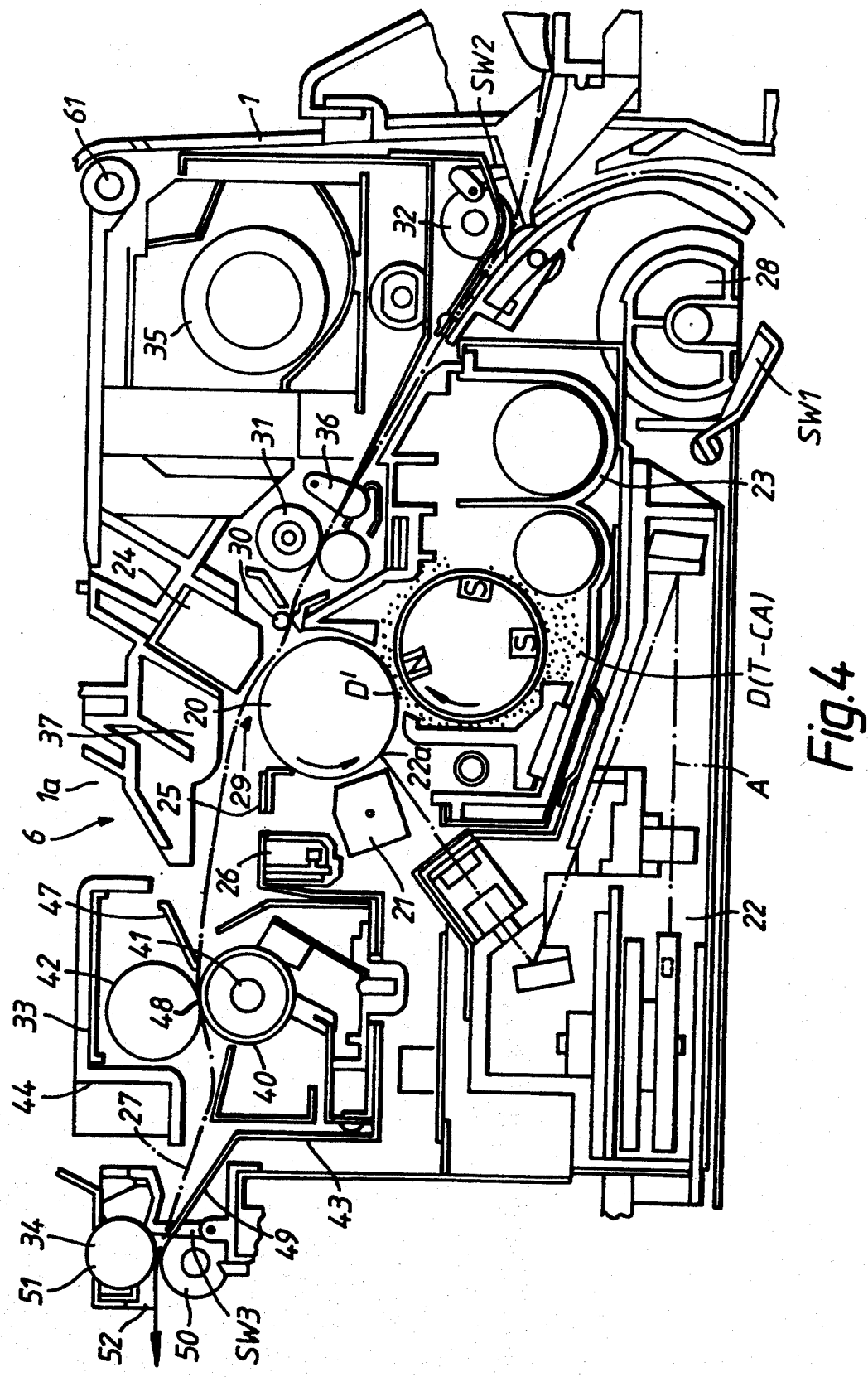
FIG. 4 is an enlarged view of a portion of the sectional view in FIG. 3, showing the arrangement of the laser printer of FIG. 1.

Paper discharge section 8 includes a recessed portion formed low in the upper surface of the front portion of laser printer 1. A pivotal paper discharge tray 13 that can be folded on paper discharge section 8 and extended, as shown in FIG. 3, is provided to the front end portion of paper discharge section 8. A substantially U-shaped notched portion is formed in the central portion of the front end of paper discharge tray 13, and an extendable auxiliary paper discharge tray 14 which can store recording sheets is provided in the notched portion. Hence, the size of paper discharge tray 13 can be adjusted in accordance with the size of the recording sheets to be discharged.

An operation panel 15 is provided in the upper surface of the left frame portion of laser printer 1 located on the left side of paper discharging section 8, and a manual feed tray 16 for manually feeding recording sheets is provided on the rear face side of laser printer 1.

Operation panel 15 has a liquid crystal display for displaying the copy count, the mode, the guide message, and the like, an LED display for displaying the various states of laser printer 1 by turning on/off light-emitting diodes, and switched for designating various types of operations.

The LED display includes an "ON-LINE" display for indicating whether or not laser printer 1 is connected to an external unit (e.g., host unit 3), i.e., for indicating the on-line/off-line mode, a "READY" display for indicating that laser printer 1 is ready to start, a "DATA" display for indicating that an image is being transferred, an "OPERATOR" display for requesting an operator call, a "SERVICE" display for requesting a service call, and a "MODE" display indicating the auto/manual mode.

The above switches includes, e.g., menu keys, value keys, and ten keys. The menu keys includes a "NEXT ITEM" key and a "PREVIOUS ITEM" key. A plurality of pieces of menu information displayed on the left half of the liquid crystal display are incremented every time the "NEXT ITEM" key is depressed, and are decremented every time the "PREVIOUS ITEM" key is depressed. These display operations are cyclically repeated in accordance with a key operation. Similarly, the value keys includes a "NEXT ITEM" key and a "PREVIOUS ITEM" key. A plurality of pieces of value information displayed on the right half of the liquid crystal display are incremented every time the "NEXT ITEM" is depressed, and are decremented every time the "PREVIOUS ITEM" key is depressed. These display operations are also cyclically repeated in accordance with a key operation.

Accordingly, the operator can select and designate a desired operation by operating the menu and value keys.

An image forming operation including charging, image exposure, development, transfer, separation, cleaning, fixing, and the like will be described. More specifically, a drum-like photosensitive body 20 serving as an image bearing member is arranged at substantially the central portion of a unit storing section. A charging device 21 includes a scorotron charger, a laser exposure unit 22 for forming an electrostatic latent image at an exposure section, a magnetic brush type developing unit 23 for performing a developing process and a cleaning process simultaneously, a transfer device 24 includes a scorotron, a memory removing device 25 includes a brush member, and a pre-exposure device 26 are sequentially disposed around photosensitive body 20 in the rotational direction thereof. Electrophotography process unit 6 obtain by integrating photosensitive body 20, charging device 21, developing unit 23, and memory removing device 25 of the above-mentioned components is detachably provided in laser printer 1.

Developing unit 23 uses a two-component developing agent D containing a toner T and a carrier CA.

A paper feed convey path 27 is formed in laser printer 1 for guiding recording sheet P, automatically fed from paper feed cassette 12 through a paper feed member 28, and recording sheet P, manually fed from manual feed tray 16, to paper discharge section 8 through an image transfer section 29 formed between photosensitive body 20 and transfer device 24.

A convey roller pair 30, an aligning roller pair 31, and a convey roller pair 32 are arranged on the upstream side of image transfer section 29 along paper feed convey path 27. A fixing unit 33 and a paper discharge roller unit 34 are arranged on the downstream side of image transfer section 29 along paper feed convey path 27.

A cooling fan unit 35 is above convey roller pair 32. An aligning switch 36 is provided in the vicinity of aligning roller pair 31. A convey guide 37 is provided above image transfer section 29.

A paper empty switch SW1 is provided in the vicinity of paper feed member 28 to detect the presence/absence of recording sheets P in paper feed cassette 12. A manual feed switch SW2 is provided in the vicinity of convey roller pair 32, and a paper discharging switch SW3 is provided in the vicinity of paper discharge roller unit 34.

To start the image forming operation, photosensitive body 20 is rotated upon reception of a print start signal from host unit 3 shown in FIG. 1. The surface of photosensitive body 20 is maintained at a predetermined potential level by pre-exposure device 26 and uniformly charged by charging device 21.

In this state, a laser beam A, which is modulated upon reception of the dot image data from host unit 3, is radiated by laser exposure unit 22 to a exposure portion 22a on photosensitive body 20. More specifically, the surface of photosensitive body 20 is scanned and exposed with laser beam A in a scanning direction while photosensitive body 20 is rotated in a rotating direction to be perpendicular to the scanning direction. As the scanning operation onto photosensitive body 20 is repeated several times, two-dimensional image which is an electrostatic latent image, is formed on photosensitive body 20 corresponding to an image signal. The electrostatic latent image on photosensitive body 20 is developed by toner T in a developing agent magnetic brush D' in developing unit 23 to be visualized and formed into a toner image.

In synchronism with the toner image forming operation, recording sheet P picked up from the paper feed cassette 12 or manually fed from manual feed tray 16 is sent to image transfer section 29 through aligning roller pair 31. Then, the toner image formed on photosensitive body 20 is transferred on recording sheet P by the function of transfer device 24.

Subsequently, recording sheet P on which the toner image is transferred is sent to fixing unit 33 through paper feed convey path 27 by the guide of convey guide 37. The toner image is fixed on recording sheet P by fusion in fixing unit 33. Thereafter, recording sheet P is discharged to paper discharge section 8 through paper discharge roller unit 34.

After the toner image is transferred from photosensitive body 20 onto recording sheet P, the excess residual toner remaining on the surface of photosensitive body 20 is disordered by memory removing device 25 in accordance with electrostatic attraction. Then, the remaining toner is uniformly distributed on the surface of photosensitive body 20, and is mechanically and electrically absorbed by developing unit 23.

Fixing unit 33 has a heat roller 40 incorporating a heater lamp 41, and a pressure roller 42 urged by heat roller 40. When recording sheet P passes between rollers 40 and 42, the toner image is fixed on recording sheet P by fusion.

Heat roller 40 and pressure roller 42 are surround by a lower casing 43 and a upper casing 44, respectively, such that heat will not escape to the outer side as much as possible, thereby maintaining proper temperature atmosphere necessary for fixing.

In upper casing 44, a paper guide 47 is arranged in the vicinity of the upstream side of a contact portion 48 of heat and pressure roller 40 and 42. Paper guide 47 can reliably guide the leading edge of recording sheet P guided by fixing unit 33 to a portion between heat and pressure rollers 40 and 42.

A paper guide 49 is provided, integrally with lower casing 43, at the outlet side of recording sheet P of fixing unit 33. Paper guide 49 guides recording sheet P, on which an image is fixed, to paper discharge roller 34.

Paper discharge roller unit 34 includes a lower roller 50 and an upper roller 51. A charge removal brush 52 is provided along the convey direction of paper discharge roller unit 34 to be in contact with the image non-forming surface side of recording sheet P.

A plastic top cover 60 is provided in open section 1a of the upper surface of laser printer 1 to be openable/closable. Transfer device 24, convey guide 37, and upper roller 51 of paper discharge roller unit 34 including charge removal brush 52 are mounted under top cover 60. Top cover 60 can be pivoted about a support shaft 61 provided on the upper portion of the rear end of laser printer 1.

When top cover 60 is pivoted upward, transfer device 24, convey guide 37, and upper roller 51 including charge removal brush 52 are pulled from open section 1a of laser printer 1. Then, most of paper feed convey path 27 and most of the components of electrophotography process unit 6 opposing paper feed convey path 27 are exposed. Therefore, when recording sheet P jams, the paper removing operation and the like can be performed easily and efficiently.

Similarly, a rear cover 62 of laser printer 1 can be opened and closed about a support shaft 63. Then, recording sheet P at the starting end side of paper feed convey path 27, i.e., recording sheet P picked up by paper feed member 28 can be easily removed as well.

An ozone filter 64 is used for removing ozone generated by charging device 21 and transfer device 24 during the printing operation. A toner cartridge 65 contains toner T for replenishment.

The control system of laser printer 1 will be described.

Referring to FIG. 1, external unit controller 2 is connected to laser printer 1 through an external unit interface connector (not shown) and electrically connected to controller 4 and printer engine 5. Printer engine 5 drives aforementioned means for performing the image forming operation.

Controller 4 includes a sync circuit 4a, a setting section 4b, and a phase correcting section 4c, and controls the entire laser printer 1.

Figure 6:
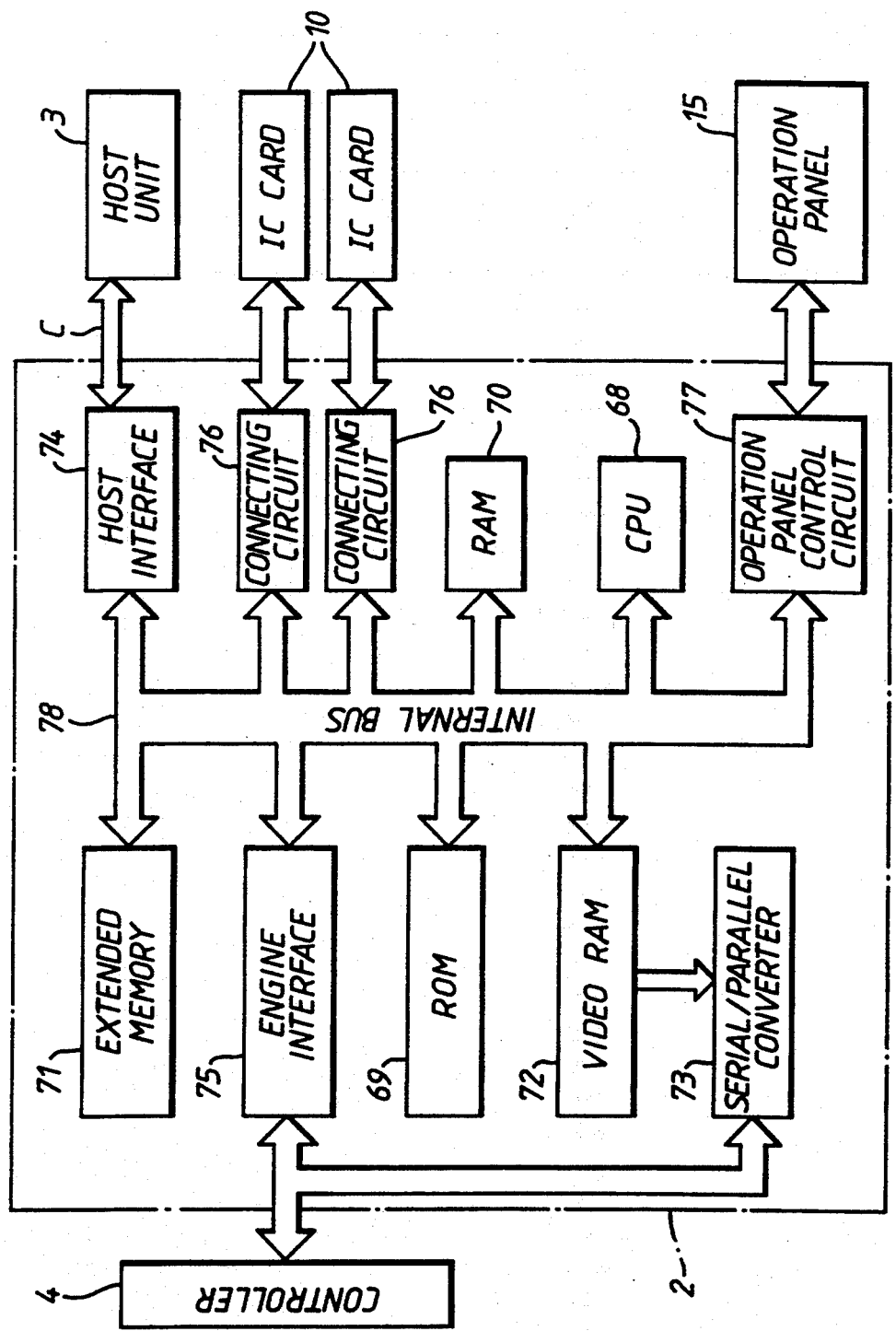
FIG. 6 is a block diagram schematically showing the arrangement of an external unit controller.

FIG. 6 shows external unit controller 2 and its peripheral units. Referring to FIG. 6, a CPU 68 controls entire external unit controller 2. A ROM 69 stores a control program. CPU 68 operates in accordance with the control program. ROM 69 stores a password number collated when data is to be changed, data concerning recording sheets P, e.g., the top margin, the left margin, and the paper type, and the like. A RAM 70 is used as a page buffer for temporarily storing image data supplied from host unit 3, and as a work buffer of CPU 68.

An extended memory 71 is a large-capacity memory unit when image data supplied from host unit 3 is a large amount data, e.g., bit map data, and RAM 70 cannot store one-page data of the image data.

A video RAM 72 stores image data developed into a bit image. An output from video RAM 72 is supplied to a serial/parallel converter 73. When an image data developed into the bit image by video RAM 72 is sent to serial/parallel converter 73 as parallel data, serial/parallel converter 73 converts the data into serial data, and sends the serial data to controller 4.

A host interface 74 exchanges data between host unit 3 and external unit controller 2, and is connected to them through a cable having two types of transfer lines, i.e., a serial transfer line and a parallel transfer line. These transfer lines can be arbitrarily used in accordance with the type of data to be exchanged with host unit 3.

An engine interface 75 mediates an exchange of various types of interface signals, including a video clock for outputting image data, and image data, between external unit controller 2 and controller 4. A connecting circuit 76 disconnects power to be supplied to IC card 10 and a signal line thereto when IC card 10 is to be inserted in or removed from the corresponding IC card connector 9, in order to prevent data stored in IC card 10 from being destroyed by noise generated upon insertion or removal of IC card 10.

An operation panel control circuit 77 performs a control operation for displaying a guide message on liquid crystal display of operation panel 15, a control operation for turning on/off or flashing the LED display of operation panel 15, a control operation for sending data input through the switches of operation panel 15 to CPU 68, and the like. An internal bus 78 is a bus for exchanging data among CPU 68, RAM 70, extended memory 71, video RAM 72, operation panel control circuit 77, host interface 74, engine interface 75, and connecting circuit 76.

Figure 7:
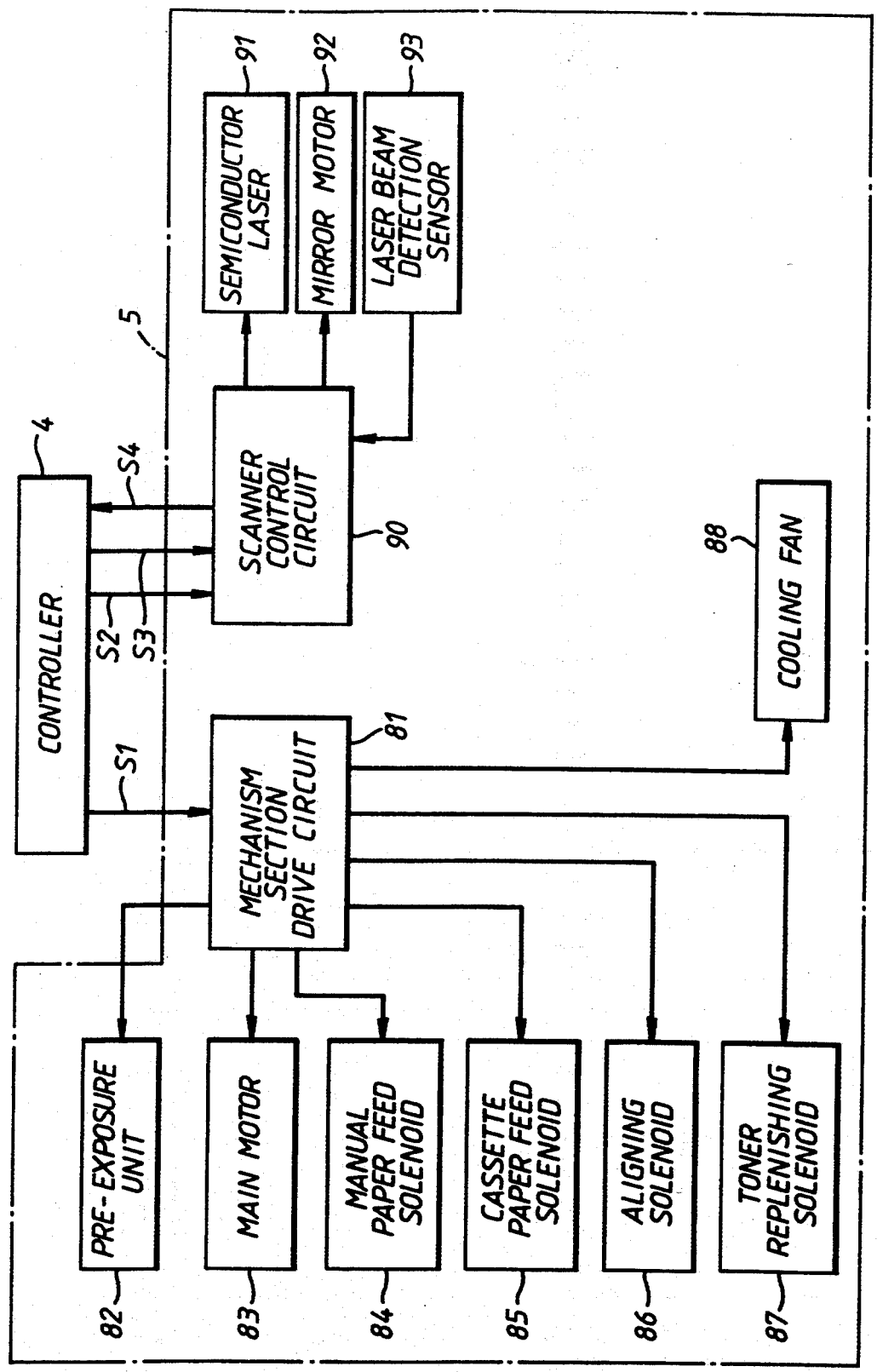
FIG. 7 is a block diagram showing the arrangement of the main part of a printer engine.

FIG. 7 shows the arrangement of the main part of printer engine 5. A mechanism section drive circuit 81 is provided with drive circuits for driving various types of motors and solenoids. Mechanism section drive circuit 81 is turned on/off by a binary control signal S1 output from controller 4. More specifically, the respective drive circuits are turned on and off when control signal S1 is "1" and "0", respectively, and supply or disconnect a voltage (e.g., +24 V) to a pre-exposure unit 82, a main motor 83, a manual paper feed solenoid 84, a cassette paper feed solenoid 85, an aligning solenoid 86, a toner replenishing solenoid 87, and a cooling fan 88. A scanner control circuit 90 is provided with drive circuits of a semiconductor laser 91 and a mirror motor 92. Semiconductor laser 91 is turned on/off by a laser modulation signal S2 output from controller 4, and mirror motor 92 is turned on/off by a control signal S3 output from controller 4. Furthermore, a laser beam detection sensor 93 uses a PIN diode. When the laser beam from semiconductor laser 91 passes laser beam detection sensor 93, a current proportional to the optical energy of the laser beam flows in laser beam detection sensor 93. This current signal is sent to controller 4 as a laser beam detection signal S4. Corresponding to the reception of laser beam detection signal S4, controller 4 outputs a horizontal sync signal HSYNC. Semiconductor laser 91, mirror motor 92 and laser beam detection sensor 93 are arranged in exposure unit 22, and radiates the laser beam A thereby. Horizontal sync signal HSYNC is output once every time the surface of the photosensitive body 20 is scanned in the scanning direction so that an exposure starting position of the photosensitive body 20 is maintained at a proper position in the scanning direction.

Figure 8:
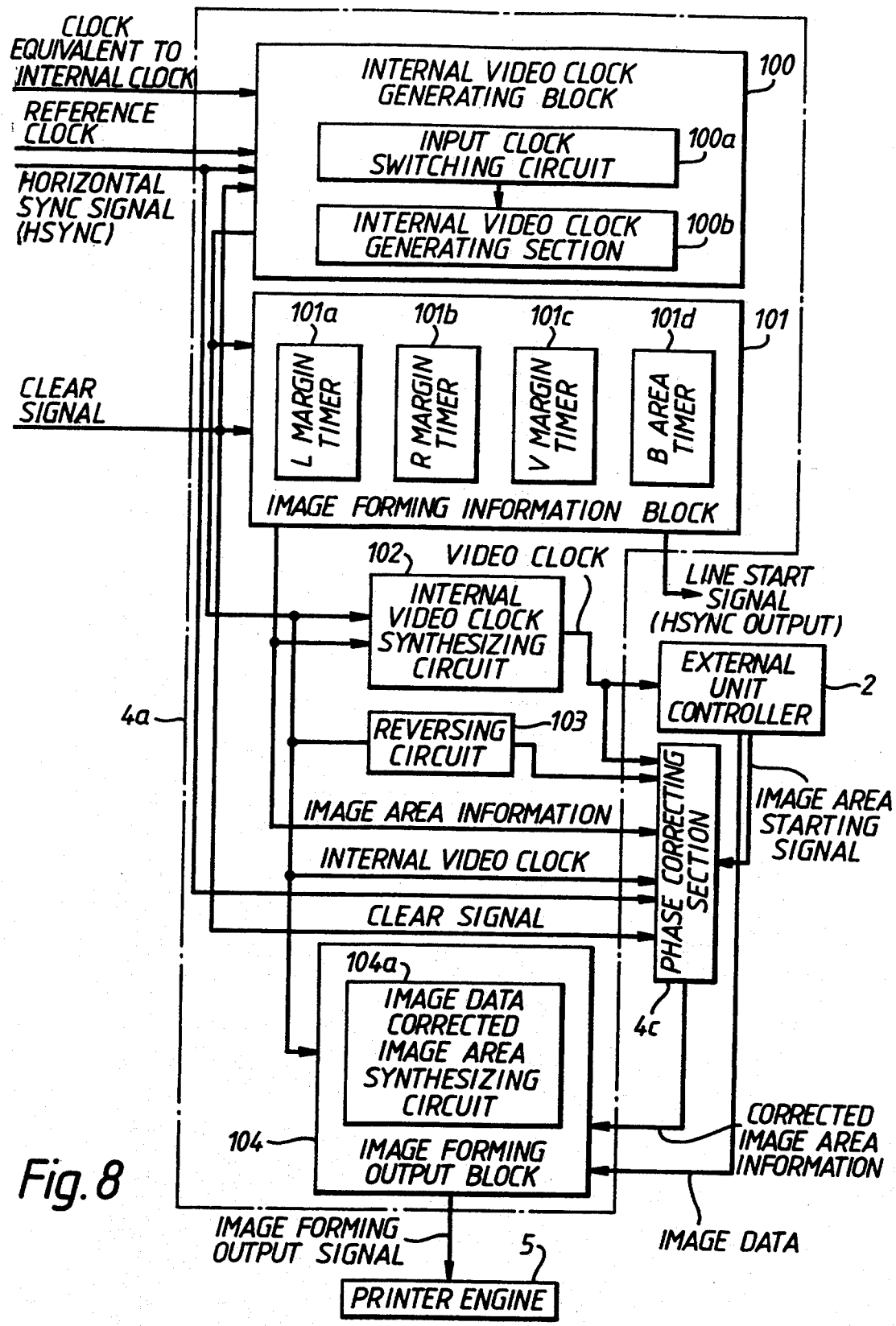
FIG. 8 is a block diagram showing an arrangement of a sync circuit.

FIG. 8 shows the arrangement of sync circuit 4a of controller 4. Sync circuit 4a includes an internal video clock generating block 100, an image forming information block 101, an internal video clock synthesizing circuit 102, a reversing circuit 103, and an image forming output block 104. Internal video clock generating block 100 generates an internal video clock. Image forming information block 101 is a timer for specifying an image forming area of paper sheet P. Internal video clock synthesizing circuit 102 synthesizes a video clock for outputting an image data and to be supplied to external unit controller 2. Reversing circuit 103 reverses the internal video clock. Image forming output block 104 outputs an image forming output signal to printer engine 5.

Internal video clock generating block 100 includes an input clock switching circuit 100a and an internal video clock generating section 100b. Input clock switching circuit 100a performs selection between a reference clock supplied from a reference clock oscillating source (not shown) of controller 4 and an external videoclock synchronized with laser beam detection signal S4 and equivalent to the internal clock, and supplies the selected signal to internal video clock generating section 100b as a reference clock. Internal video clock generating section 100b generates an internal video clock by synthesizing the reference clock supplied to it and horizontal sync signal HSYNC generated by controller 4. Horizontal sync signal HSYNC is also sent to phase correcting section 4c so as to clear a counting value of a counter for counting a delay amount as described later.

The internal video clock generated by internal video clock generating section 100b is supplied to image forming information block 101, internal video clock synthesizing circuit 102, reversing circuit 103, image forming output block 104, and phase correction section 4c.

Image forming information block 101 includes an L margin timer 101a for the left margin, an R margin timer 101b for the right margin, a V margin timer 101c for the vertical area, and a B area timer 101d for detecting the paper width and horizontal sync signal HSYNC. Based on the input internal video clock, image forming information block 101 forms one scan line image area output for a width (printing width) corresponding to the video clock input, i.e., image area information, by using timers 101a to 101d.

The image area information is supplied to internal video clock synthesizing circuit 102 and phase correcting section 4c.

Internal video clock synthesizing circuit 102 forms a video clock (video clock for outputting image data) corresponding to the image area from the internal video clock and the image area information supplied to it, and outputs the video clock to external unit controller 2 and phase correcting section 4c. The video clock for outputting image data is used for causing external unit controller 2 to output the bit map data (image data) and for causing phase correcting section 4c to correct the delay time of the image data input from external unit controller 2.

Reversing circuit 103 reverses the input internal video clock by an inverter (not shown), and outputs the reverse clock of the internal video clock to phase correcting section 4c. The reverse clock of the internal video clock is used when the rise and fall are to be set in delay setting by phase correcting section 4c.

By using an image data/corrected image area synthesizing circuit 104a, image forming output block 104 forms an image forming output signal (image output) from the internal video clock supplied from internal video clock generating section 100b, the corrected image area information supplied from phase correcting section 4c, and the image data supplied from external unit controller 2, and outputs the image forming output signal (image output) to printer engine 5.

Internal video clock synthesizing circuit 102 of sync circuit 4a sends video clocks of a count corresponding to one line determined by conditions (e.g. image data) to external unit controller 2. Based on the output timing of the video clocks, external unit controller 2 outputs the image data supplied from host unit 3 to sync circuit 4a.

A clear signal is provided to internal video clock generating block 100, image forming information block 101, and phase correcting section 4c from host unit 3 through external unit controller 2. When the clear signal is provided, each of these circuit is initialized.

The internal video clock is used also for image formation.

The image data input from external unit controller 2 to sync circuit 4a is delayed from the internal video clock supplied from sync circuit 4a due to the elements and the like in external unit controller 2. This delay is caused by elements which external unit controller. 2 includes and differs depending on the employed external unit controller 2.

In this embodiment, there are two independent means for correcting this delay. One is a means for manually correcting it, the other one is a means for automatically correcting it. When the delay is manually corrected, an operator sets the correcting amount corresponding to the phase difference to setting section 4b in units of ½ clocks.

When the delay is automatically corrected, phase correcting section 4c determines the delay amount of the internal video clock according to an image area starting signal ([H] to [L]) and sets the correcting amount corresponding to the delay amount in units of ½ clocks. The image area starting signal is output from external unit controller 2 in response to the number of clocks which is input to internal video clock synthesizing circuit 102.

Based on this setting, phase correcting section 4c supplies corrected image area information, delayed from the internal video clock by the preset clock count, to sync circuit 4a.

Setting section 4b includes a combination of, e.g., a 1-chip microcomputer and a ROM.

Figure 9A:
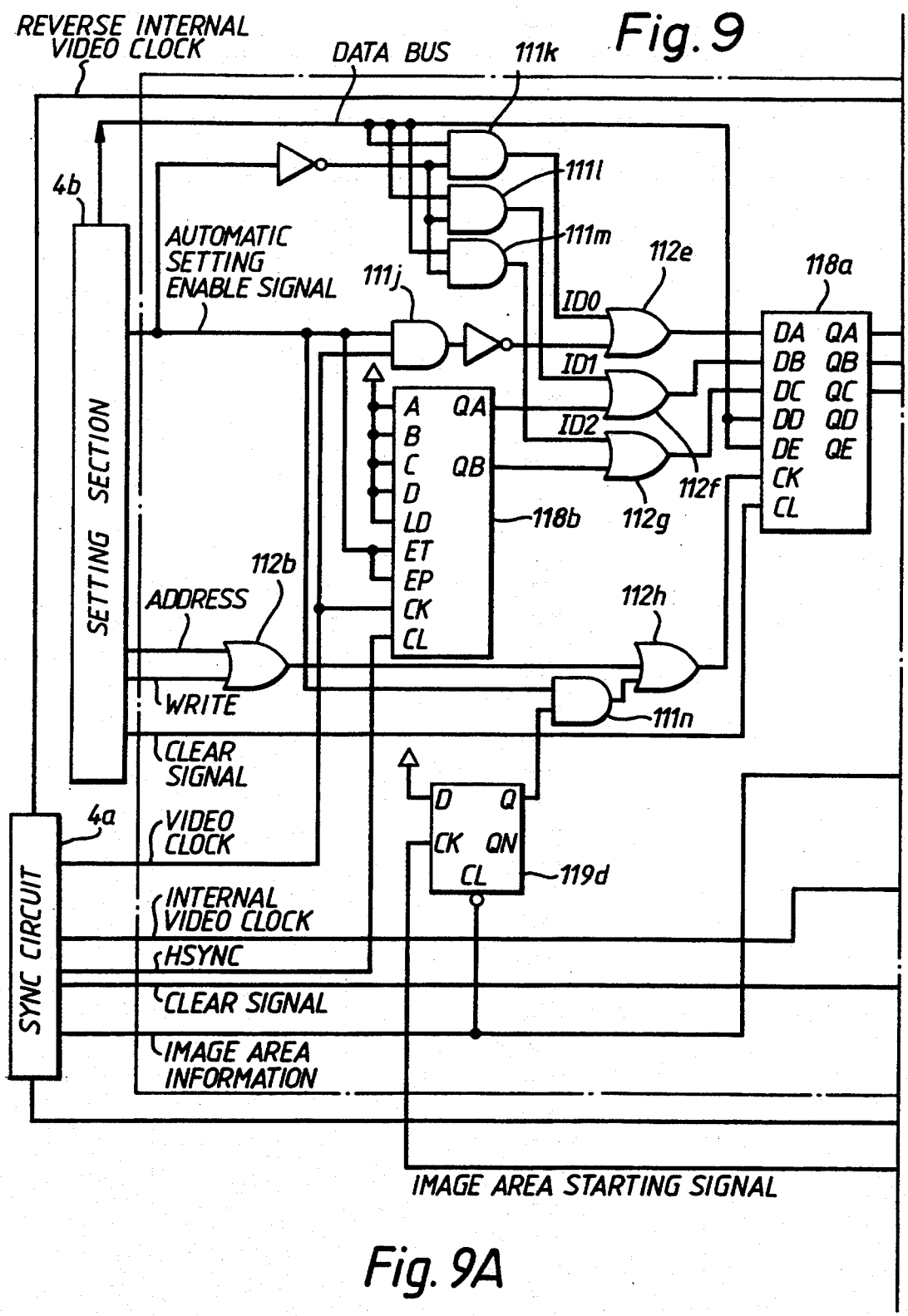
FIG. 9 is a block diagram showing an arrangement of a phase correcting section.
Figures 9, 9B:
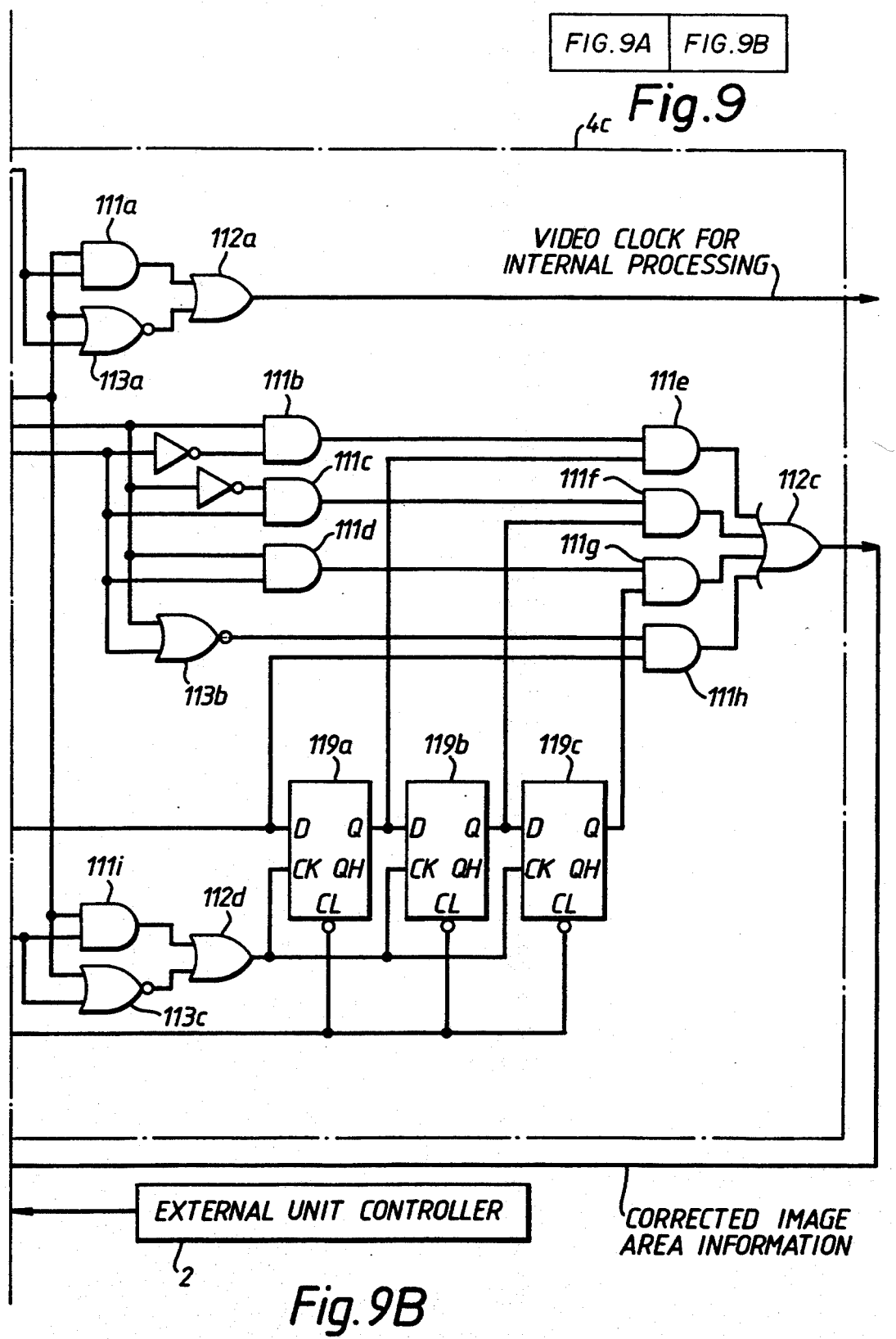

FIG. 9 shows an arrangement of phase correcting section 4c in controller 4. Phase correcting section 4c includes AND gates 111a to 111n, OR gates 112a to 112h, NOR gates 113a to 113c, D type flip-flop circuits 119a to 119d, a video clock delay control register (an address signal and an access write signal) 118a, and a video clock output counter 118b.

The address signal (1 CH) of setting section 4b is information for setting video clock delay control register (VCDC register) 118a when the delay amount is manually corrected, and data bus setting data is output from VCDC register 118a at the change-over edge from "L" level to "H" level of the write signal.

VCDC register 118a is used for phase adjustment to correct the delay of the internal video clock to be synthesized with the image data developed into the bit map and sent from external unit controller 2. In the 8-bit setting signal set by setting section 4b or phase correcting section 4c and shown in FIG. 10, a bit "ISCE" sets the leading or trailing edge of the internal video clock. If bit "ISCE" is "0", it sets a trailing edge; if bit "ISCE" is "1", it sets a leading edge. At this time, selection between the internal video clock and the reverse internal video clock is performed in phase correcting section 4c.

A bit "ICD01" and a bit "ICD00" set a maximum of 3-clock delay of the internal video clock for phase adjustment. If these bits are "00", no delay is set. If these bits are "01", a 1-clock delay is set. If these bits are "10", a 2-clock delay is set. If these bits are "11", a 3-clock delay is set.

Figure 11:
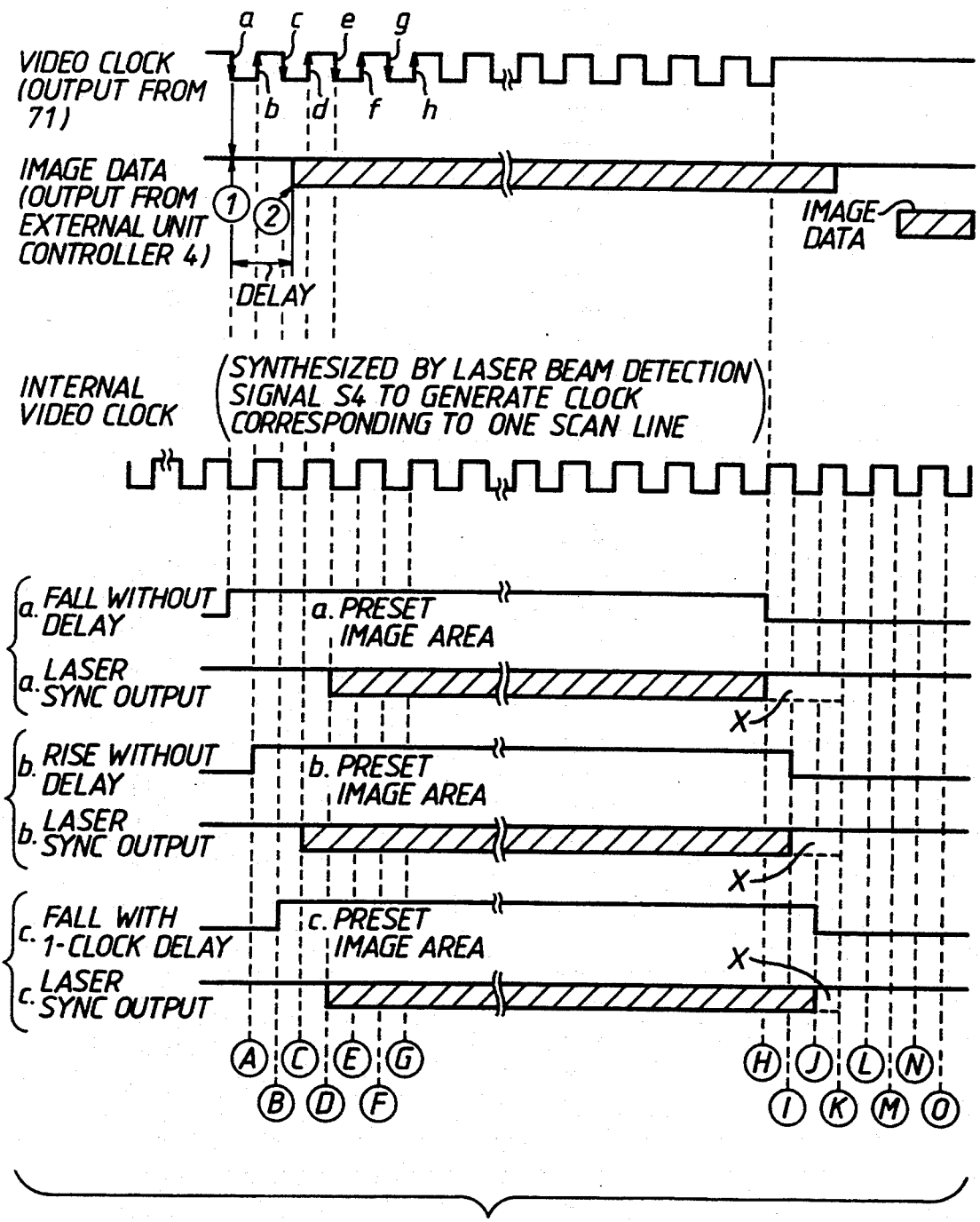
FIG. 11 is a timing chart for explaining the sync adjustment of the video clock and image data.
Figure 12:
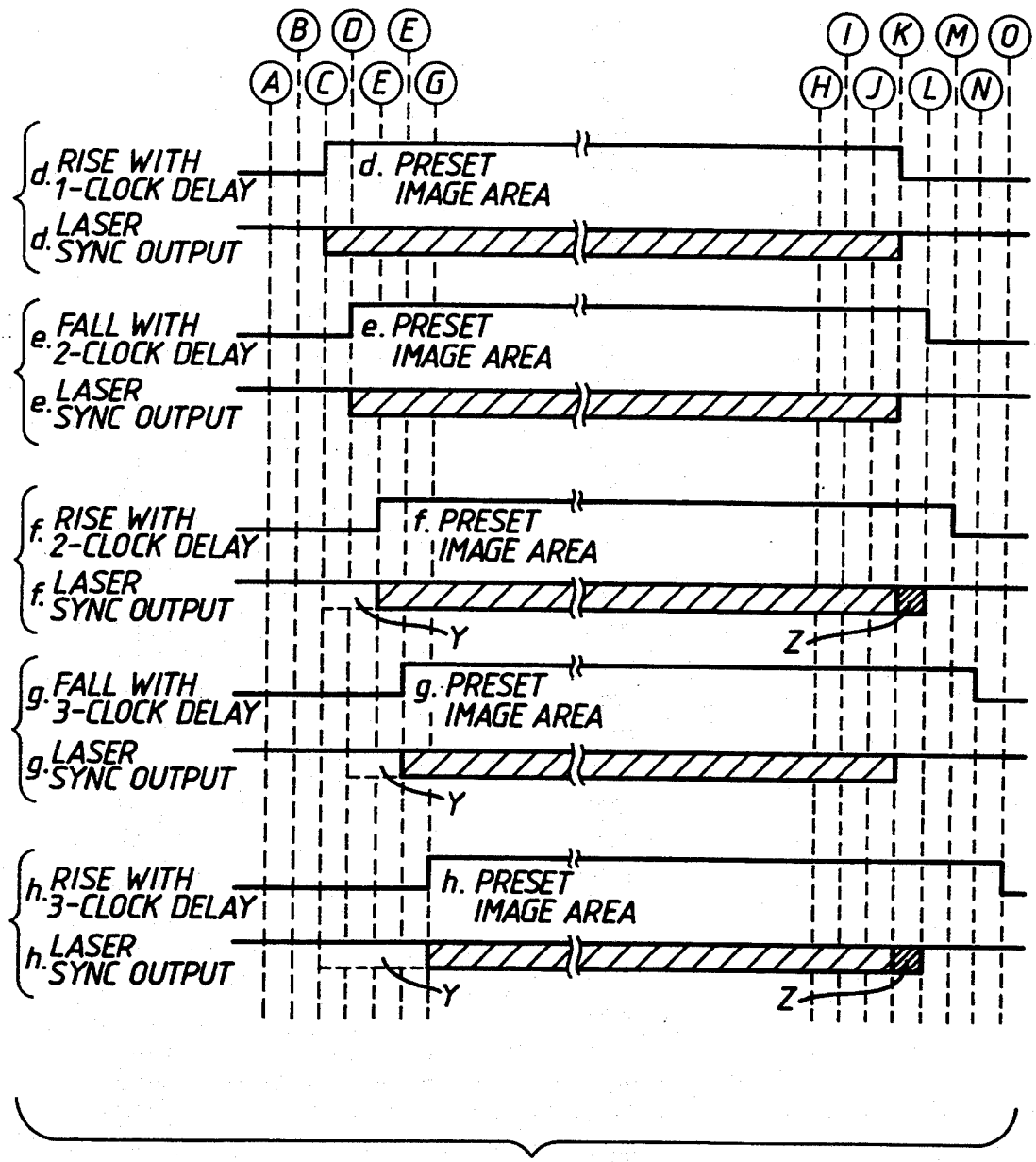
FIG. 12 is a timing chart for explaining the sync adjustment of the video clock and image data.

Phase adjusting of the internal video clock and the image data will be described with reference to FIGS. 11 and 12. FIG. 11 shows broken lines "A" to "O" indicating the positions of the respective edges of the video clock, which corresponding to "A" to "O" of FIG. 12.

The video clock can be phase-adjusted at eight points (edges) a to h by setting VCDC register 118a. The image data input to controller 4 is delayed from the video clock due to the elements and the like in external unit controller 2, as described above. This delay differs depending on the types of external unit controller 2.

The delay caused by the elements and the like of the employed external unit controller 2 is determined in advance. A correction amount is set in setting section 4b by using operation panel 15 in accordance with a keyboard operation or set by phase correcting section 4c, and the image data and the internal video clock for image formation are synchronized. This correction amount is set by using three bits at positions "0", "1", and "2" of FIG. 10, as will be described later.

More specifically, the correction amount is set in setting section 4b as follows.

In response to the operation of operation panel 15, setting section 4b sets an automatic setting enable signal to be a disabling condition in which the setting of the correction amount is performed by the manual operation.

For example, assume that the first trailing edge of the video clock output from sync circuit 4a to the external unit controller 2 is at point a.

When the image data input to controller 4 has a data start position "1" (FIG. 11), noted in the "image data (output from external unit controller 4)" waveform, due to a delay caused by the elements and the like in external unit controller 2, the timing waveform "a. fall without delay" is set in setting section 4b, and the internal video clock supplied from sync circuit 4a is directly used unchanged for image formation. In response to the video clock for image formation, the image data supplied from external unit controller 2 is printed out by printer engine 5 through image forming output block 104.

When the image data input to controller 4 has a data start position "2" (FIG. 11), noted in the "image data (output from external unit controller 4)" waveform, due to a delay caused by the elements and the like in external unit controller 2, it has been delayed from the first trailing edge "a" of the video clock (FIG. 11) by one clock and a half. Hence, the clock count will be less than the image data by one clock and a half unless a 1.5-clock delay is set by setting section 4b. Accordingly, setting section 4b sets the timing waveform "d. rise with 1-clock delay" (FIG. 12) or "e. fall with 2-clock delay" (FIG. 12), so that image area information (corrected) for synchronization whose internal video clock is subjected to correction of "rise with 1-clock delay" or "fall with 2-clock delay" by phase correcting section 4c is output.

In this case, the image data is set without a problem with "d. rise with 1-clock delay" or "e. fall with 2-clock delay". With the other timing waveforms, i.e., "a. rise without delay" to "c. fall with 1-clock delay", the image data at the trailing end indicated by reference symbol X is missing. With the timing waveforms "f. rise with 2-clock delay" to "h. rise with 3-clock delay" (FIG. 12), the image data at the leading end indicated by reference symbol Y is missing. With the waveforms "f. rise with 2-clock delay" or "h. rise with 3-clock delay", since the image data is counted at every clock, additional final data indicated by reference symbol Z is added.

Figure 10:
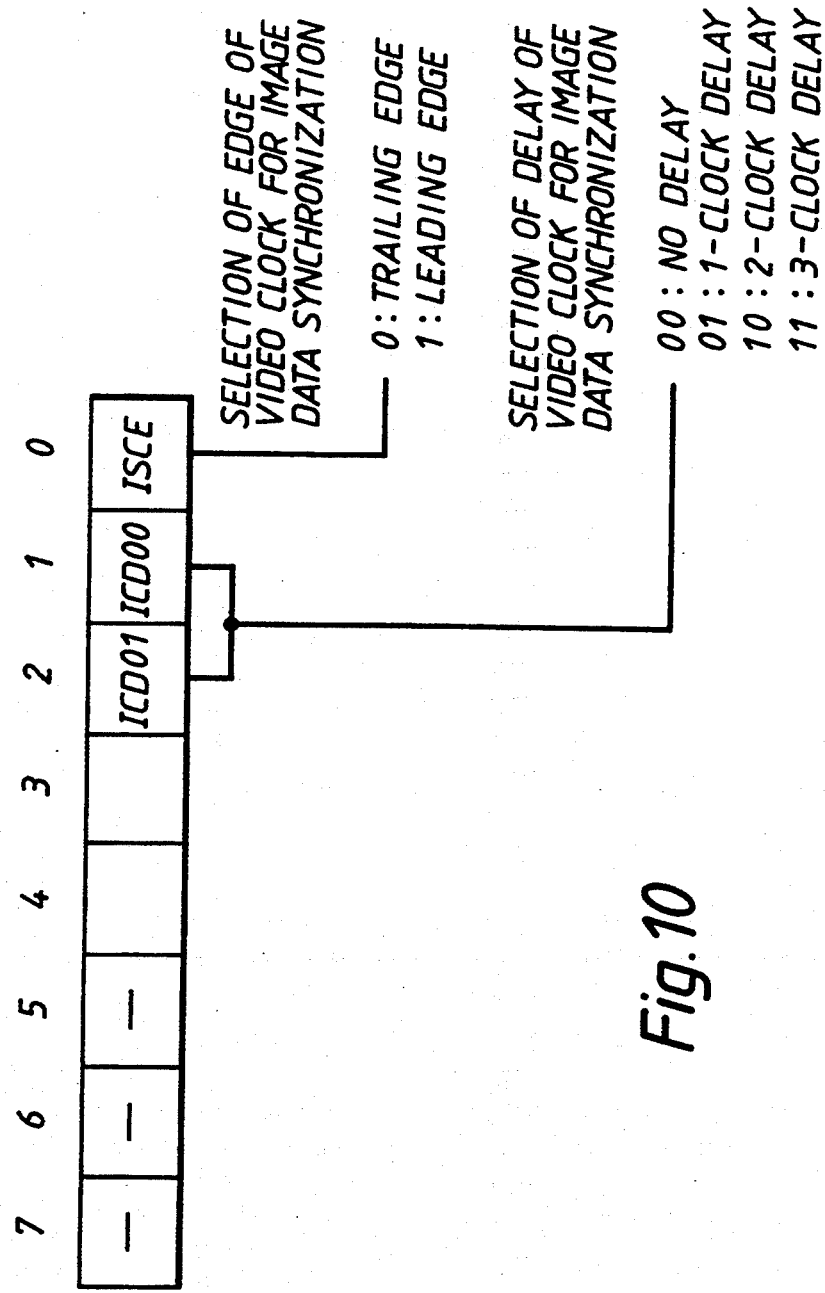
FIG. 10 is the bit format for explaining a setting signal.

The setting operation described above is performed by outputting an 8-bit setting signal including bit positions "0" to "7", as shown in FIG. 10, from setting section 4b to phase correcting section 4c. For example, when the waveform "d. rise with 1-clock delay" is to be set, the "0"-bit position of this 8-bit setting signal is "1" indicating a leading edge, the 1-bit position thereof is "1" indicating a 1-clock delay, and the "2"-bit position thereof is "0" indicating a 1-clock delay. The "3" to "7"-bit positions do not concern this embodiment, and a detailed description thereof will be omitted.

The automatic setting operation of the correcting amount will be described.

Setting section 4b sets the automatic setting enable signal to be a high level ("1") in which the setting of the correction amount is automatically performed, and outputs it to AND gates 111j, 111k, 111l, and 111m.

AND gate 111j sets an input terminal DA of VCDC register 118a through OR gate 112e on the basis of the automatic setting enable signal and the clock level of the combined internal video clock which is "L" or "H", so input terminal DA is set in "1" or "0" periodically. Video clock output counter 118b is enabled to count the video clock when the automatic setting enable signal is input to input terminals ET and EP. When the horizontal sync signal HSYNC is input to an input terminal CL, video clock output counter 118b is initialized. After that, video clock output counter 118b starts to count the video clock. According to the counted value, each of output terminals QA and QB outputs a predetermined signal to set input terminals DB and DC of VCDC register 118a through each of OR gates 112f and 112g. Since the counting value by the video clock output counter 118b increases corresponding to the input of the video clock, the setting value of input terminals DA, DB, and DC also increase until the image area starting signal from external unit controller 2 is input to input terminal CK of VCDC register 118a through D type flip-flop circuit 119d, AND gate 111n, and OR gate 112h. When the image area starting signal is input to input terminal CK, VCDC register 118a latches the setting value of the input terminals DA, DB, and DC as the delay amount.

Figure 14:
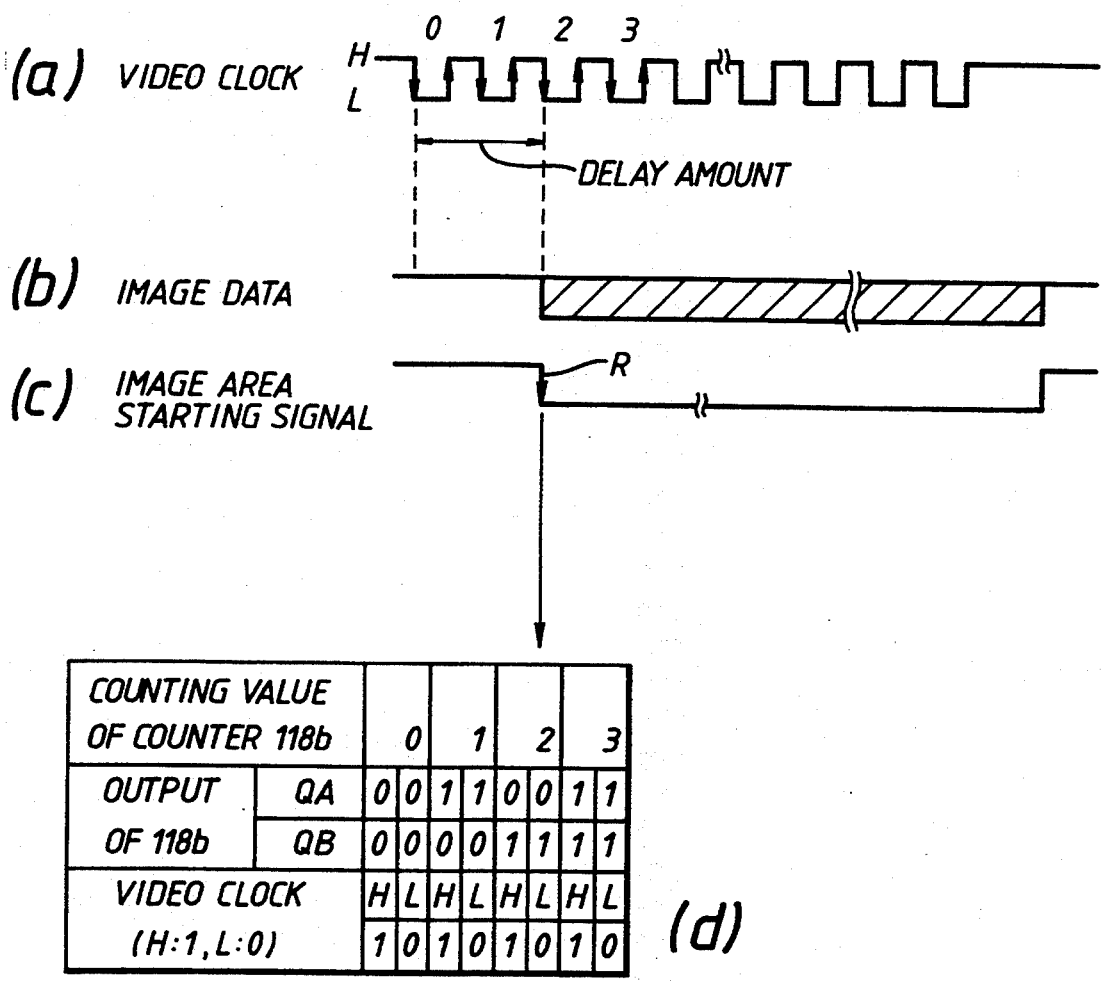
FIGS. 14(a-f) are charts for explaining a setting operation of the correcting amount by the phase correcting section.

FIG. 13 shows the operation logic table representing the correlation between the output value from output terminals and the clock level of the combined internal video clock, and setting values of input terminals DA, DB, and DC, As shown in FIGS. 14(a) to 14(c), for example, the delay amount from the receipt of the video clock to the receipt the image area starting signal is two clock, and the clock level of the video clock is the low level "L". In this case, as shown in FIGS. 14(d) to 14(f), the output from output terminal QB is "1", the output from output terminal QA is "0", and input terminals DA, DB, and DC are temporarily set to "1", "0", and "1" respectively. As the image area starting signal is input to input terminal CK in this condition, the setting amount of input terminals DA, DB, and DC are latched and the correcting amount is automatically set to "rise with 2-clock delay".

The other input terminal of OR gate 112e connects to setting section 4b through AND gate 111k and a data bus ID0. The other input terminal of OR gate 112f connects to setting section 4b through AND gate 111l and a data bus ID1. The other input terminal of OR gate 112g connects to setting section 4b through AND gate 111m and a data bus ID2. The other input terminals of AND gates 111k, 111l, and 111m receive the inverted automatic setting enable signal from setting section 4b which is set to the high level ("1").

One input terminal of OR gate 112h connects to the output terminal of AND gate 111n which connects an output terminal Q of D type flip-flop circuit 119d and the output terminal of setting section 4b which outputs the automatic setting enable signal. The other input terminal of OR gate 112h connects the output terminal of OR gate 112b which connects output terminals of setting section 4b. The output terminals of setting section 4b output the aforementioned address signal and the write signal to OR gate 112b. An output terminal of OR gate 112h connects to a clock input terminal of VCDC register 118a to automatically discriminate the start of the image data and set the setting value of VCDC register 118a.

FIG. 15 shows the operation logic table of the respective circuit constituent elements of phase correcting section 4c which is set as described above. In the item of the "constituent element" of FIG. 15, "118a QA" indicates a QA output from VCDC register 118a, "118a QB" indicates a QB output from VCDC register 118a, and "118a QC" indicates a QC output from VCDC register 118a. "111b, 111c, and 111d" indicate the corresponding AND gate outputs. "113b" indicates a NOR gate 113b output. "111e, 111f, 111g, and 111h" indicate corresponding AND gate outputs. "112c" indicate an OR gate 112c output. "119a D input" is a D input to D type flip-flop circuit 119a, and "119a Q output" is a Q output from D type flip-flop circuit 119a. "119b Q output" is a Q output from D type flip-flop circuit 119b, and "119c Q output" is a Q output from D type flip-flop circuit 119c.

Accordingly, from the operation logic table of FIG. 15, the D input to D type flip-flop circuit 119a is unchanged image area information without a delay, the Q output from D type flip-flop circuit 119a is image area information with a 1-clock delay, the Q output from D type flip-flop circuit 119b is image area information with a 2-clock delay, and the Q output from D type flip-flop circuit 119c is image area information with a 3-clock delay.

Figure 16:
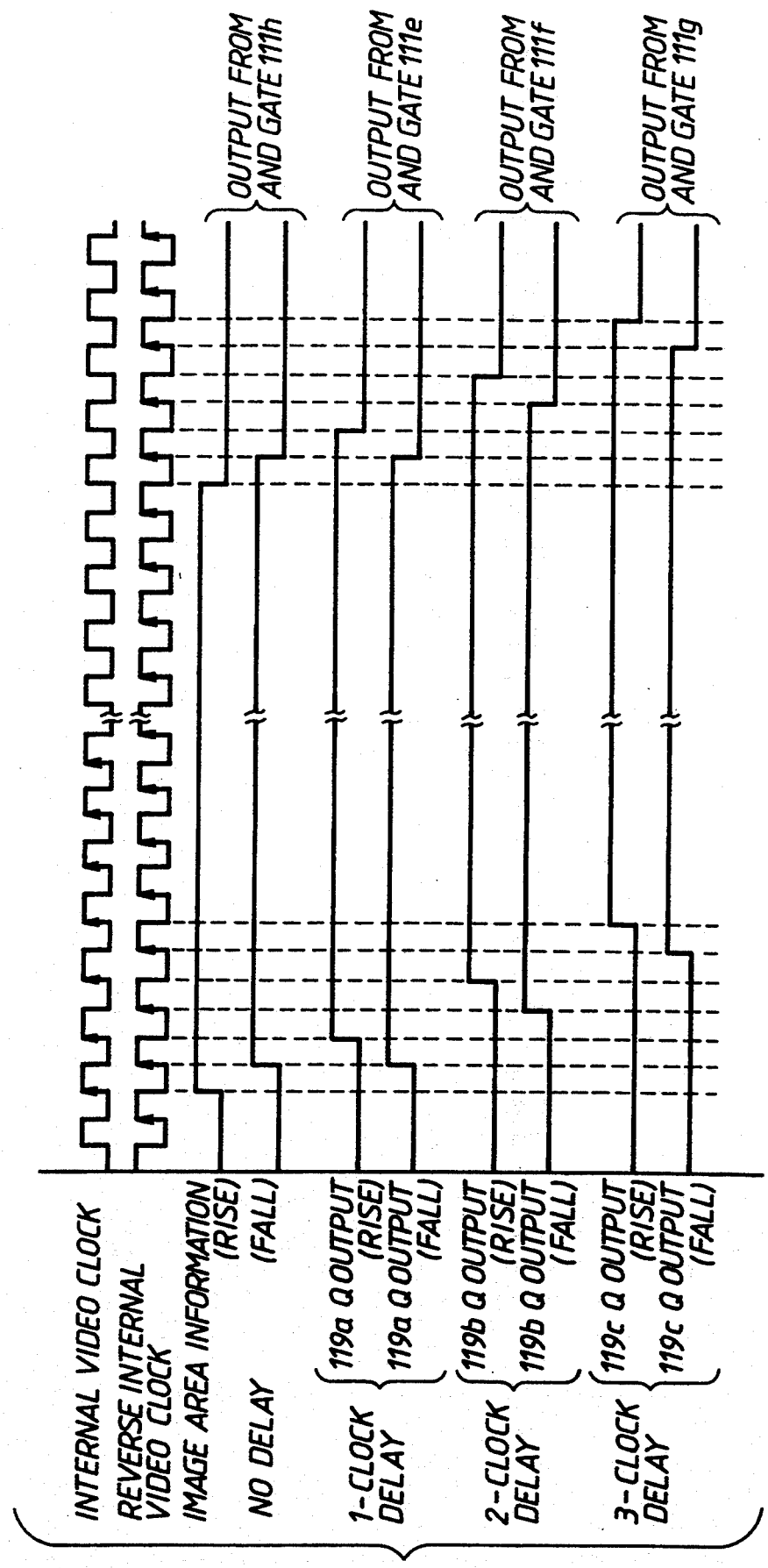
FIG. 16 is a chart for explaining an internal video clock, a reverse internal video clock, and the delay position of image area information.

FIG. 16 shows timing waveforms for "no delay", "1-clock delay", "2-clock delay", and "3-clock delay" obtained at this time from the internal video clock and the reverse internal video clock. AND gates 111e to 111h are determined by AND gates 111b to 111d and NOR gate 113b, and are set by VCDC register 118a.

With respect to the setting signal shown in FIG. 10, the 1st, 2nd, 3rd, 4th, and 5th bits are input to input terminals DA, DB, DC, DD, and DE, respectively, of VCDC register 118a shown in FIG. 9 through the data bus. The 4th and 5th bits do not concern this embodiment and a description thereof will thus be omitted.

VCDC register 118a is initialized by the clear signal when it is reset by a microcomputer (not shown) or when it is turned on. In the case that the correcting value is set by setting section 4b, the initialized VCDC register 118a is selected by the setting signal from the data bus in response to the address signal, and the leading edge of the write signal is latched by the register of VCDC register 118a as a clock.

When the correcting amount is automatically set, the register of initialized VCDC register 118a latches the setting signal from OR gates 112e, 112f, and 112g in response to the leading edge of the image area starting signal from external unit controller 2.

A rise or fall selection clock is output from output terminal QA of VCDC register 118a to AND gates 111a and 111i and NOR gates 113a and 113c. Delayed image area information is output from output terminals QB and QC of VCDC register 118a to AND gates 111b to 111h and NOR gate 113b. The image area information set by output terminals QB and QC are synthesized by OR gate 112c and output therefrom.

AND gates 111b to 111d, and NOR gate 113b serve to select one of the selection results of AND gates 111e to 111h, and are circuits for synthesizing the selection results in accordance with the selection of the image data area delay operation performed by D type flip-flop circuit 119a to 119c.

Output terminals QD and QE do not directly concern the present invention and a description thereof will thus be omitted.

AND gates 111b to 111d, and NOR gate 113b output "1" to one of AND gates 111e to 111h in accordance with the conditions of VCDC register 118a. The internal video clock selects the rise or fall clock by OR gate 112d in accordance with output terminal QA preset output, and the selected clock is output to clock input terminals CK of D type flip-flop circuits 119a, 119b, and 119c. In this way, the output of the video clock extends in accordance with the conditions of VCDC register 118a and all image data is output to printer engine 5 synthesizing the video clock. D type flip-flop circuits 119a, 119b, 119c are initialized by the clear signal in units of lines.

FIGS. 17 to 20 show a second embodiment of the image data transmitting/receiving apparatus of the invention in relationship with correcting operation of the delay time. In this embodiment, the correction of the delay time output from external unit controller 2 is performed by using the video clock output from sync circuit 4 and the image data output from external unit controller 2.

Figure 17:
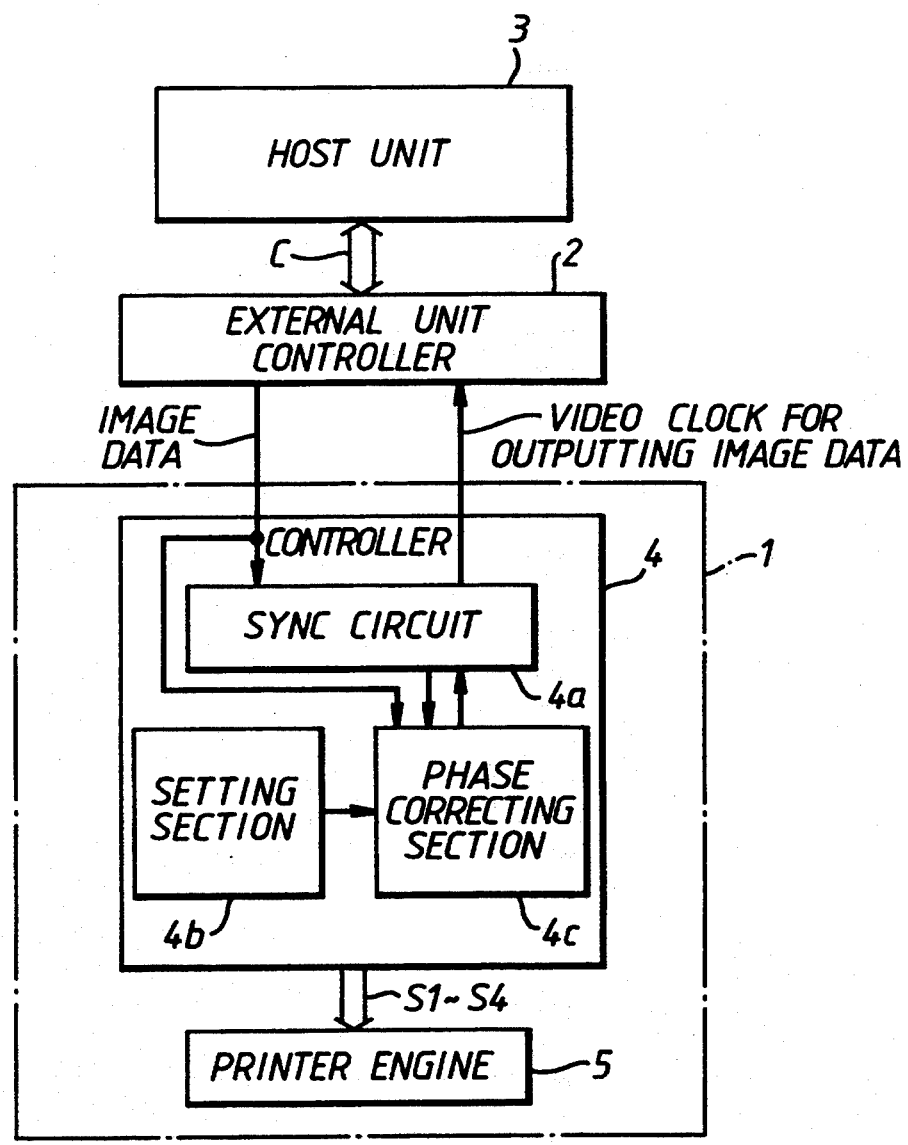
FIG. 17 is a block diagram schematically showing the arrangement of the entire system of a second embodiment of the present invention.
Figure 18:
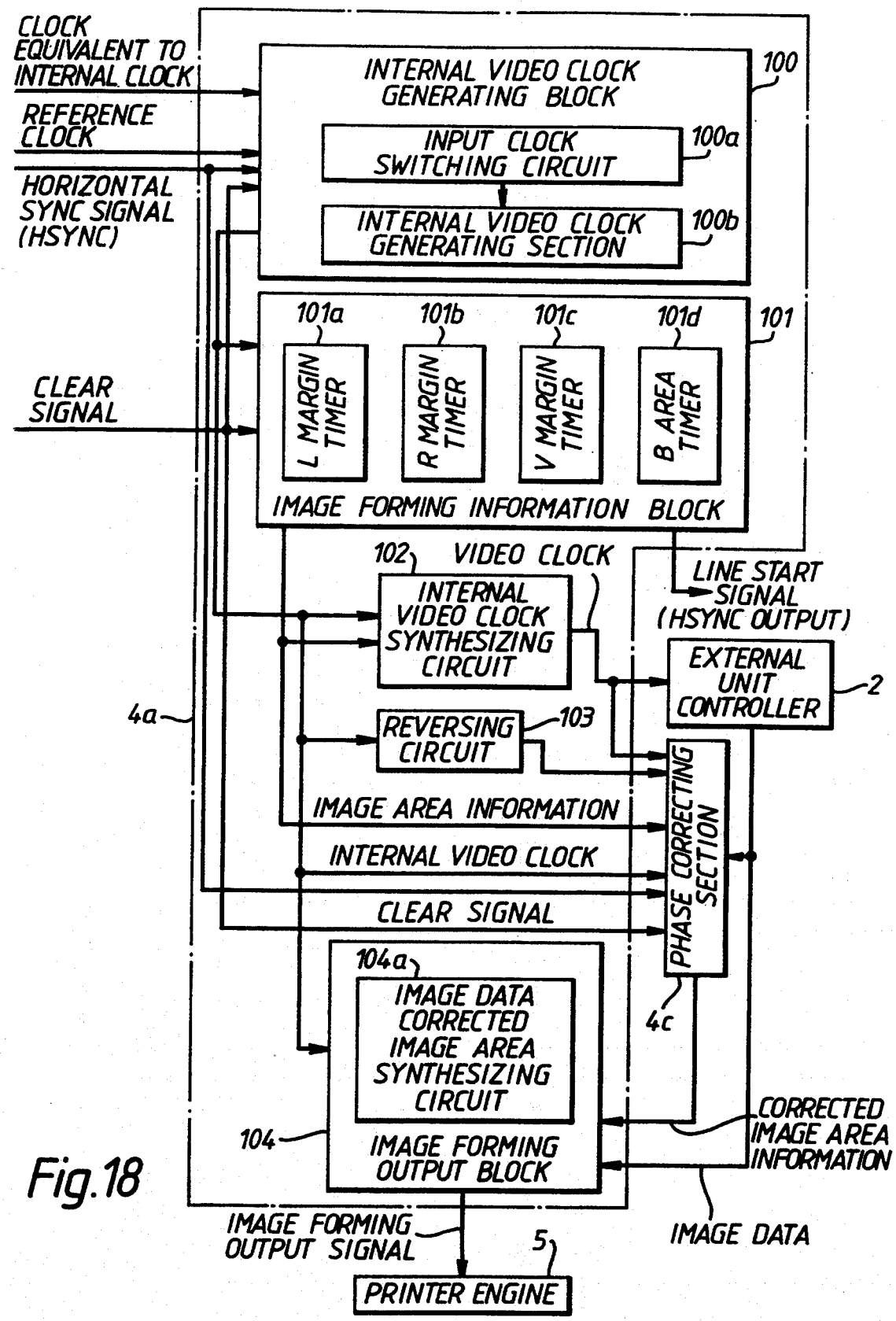
FIG. 18 is a block diagram showing an arrangement of a sync circuit of the second embodiment.
Figure 19A:
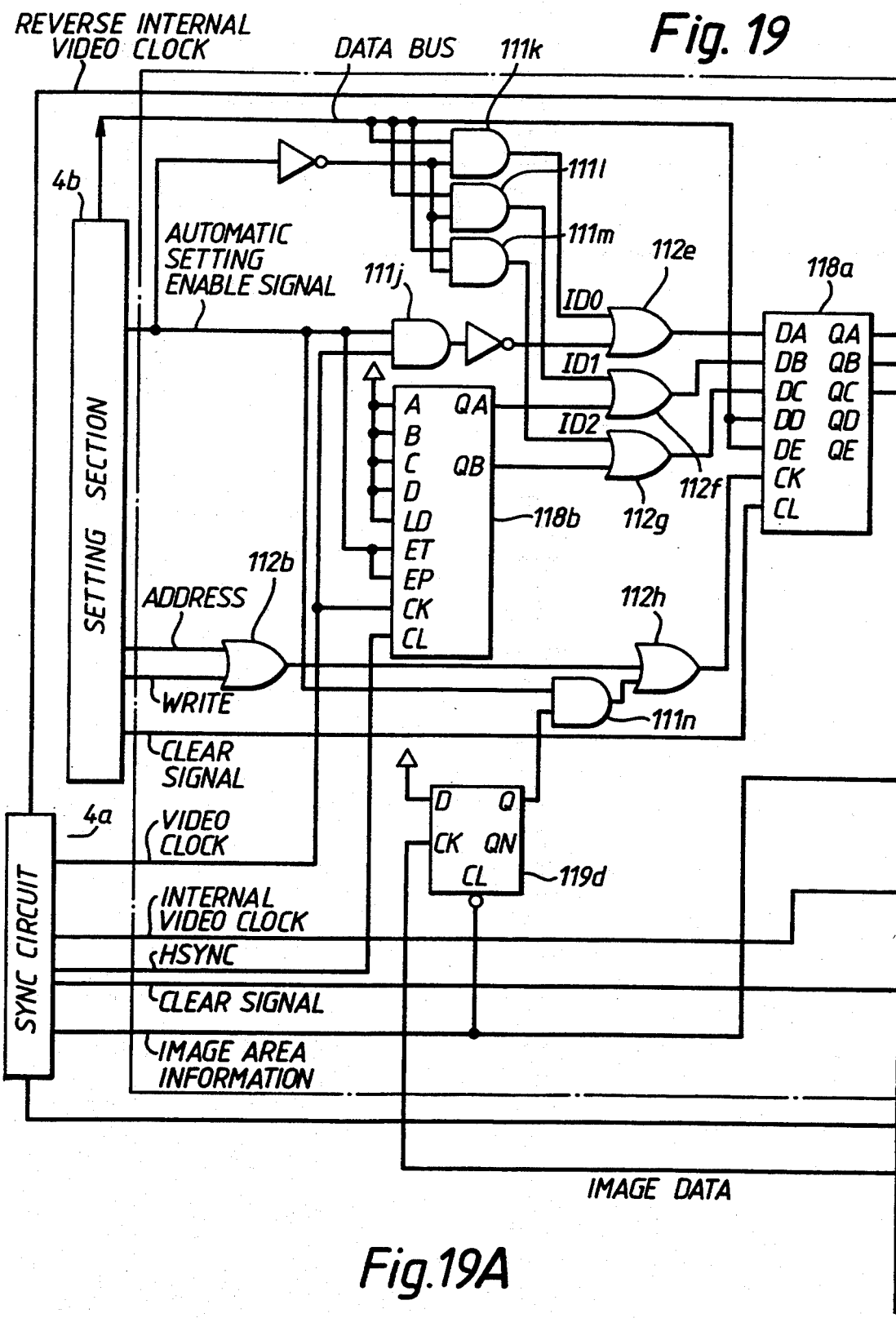
FIG. 19 is a block diagram showing an arrangement of a phase correcting section of the second embodiment.
Figures 19, 19B:
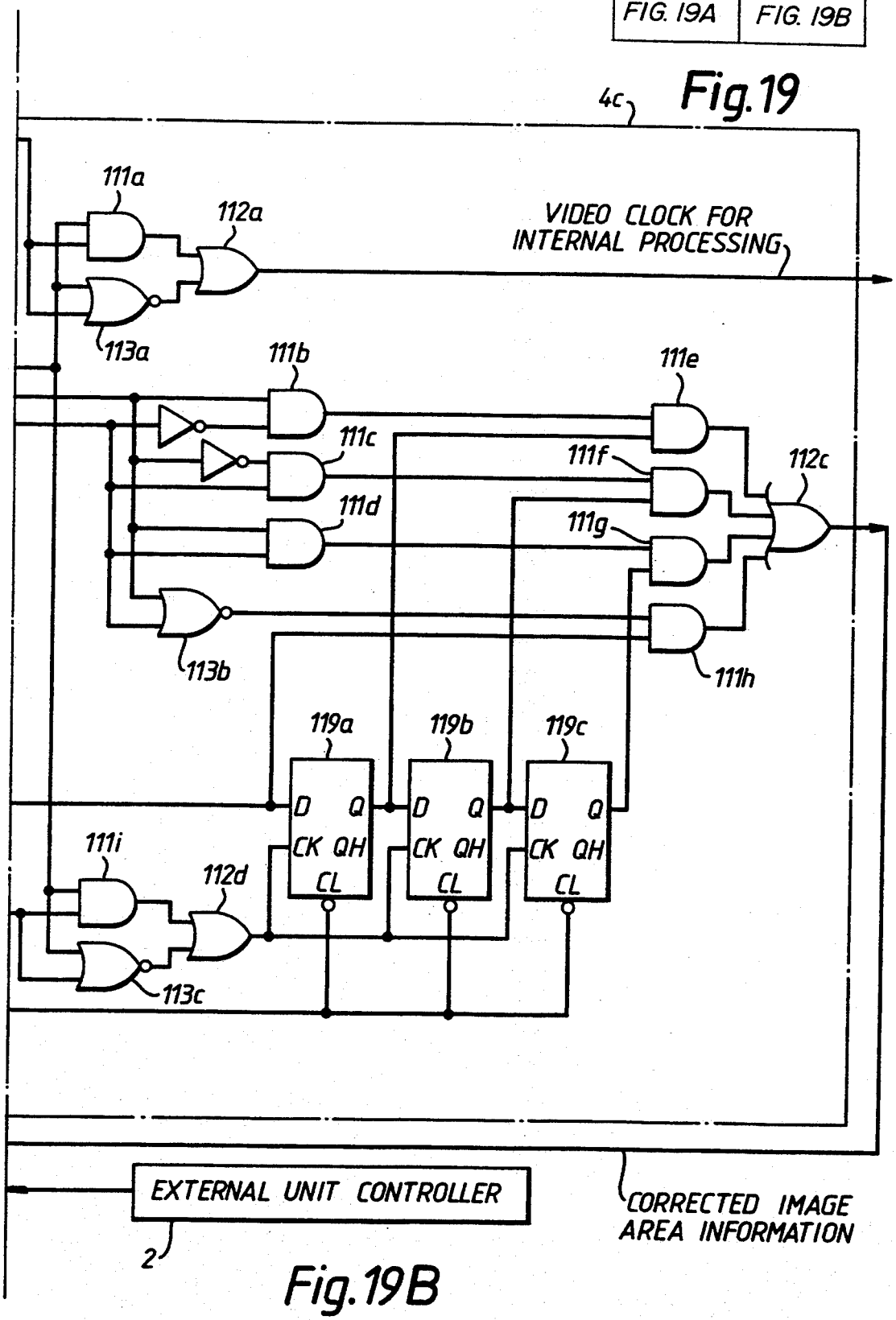
Figure 20:
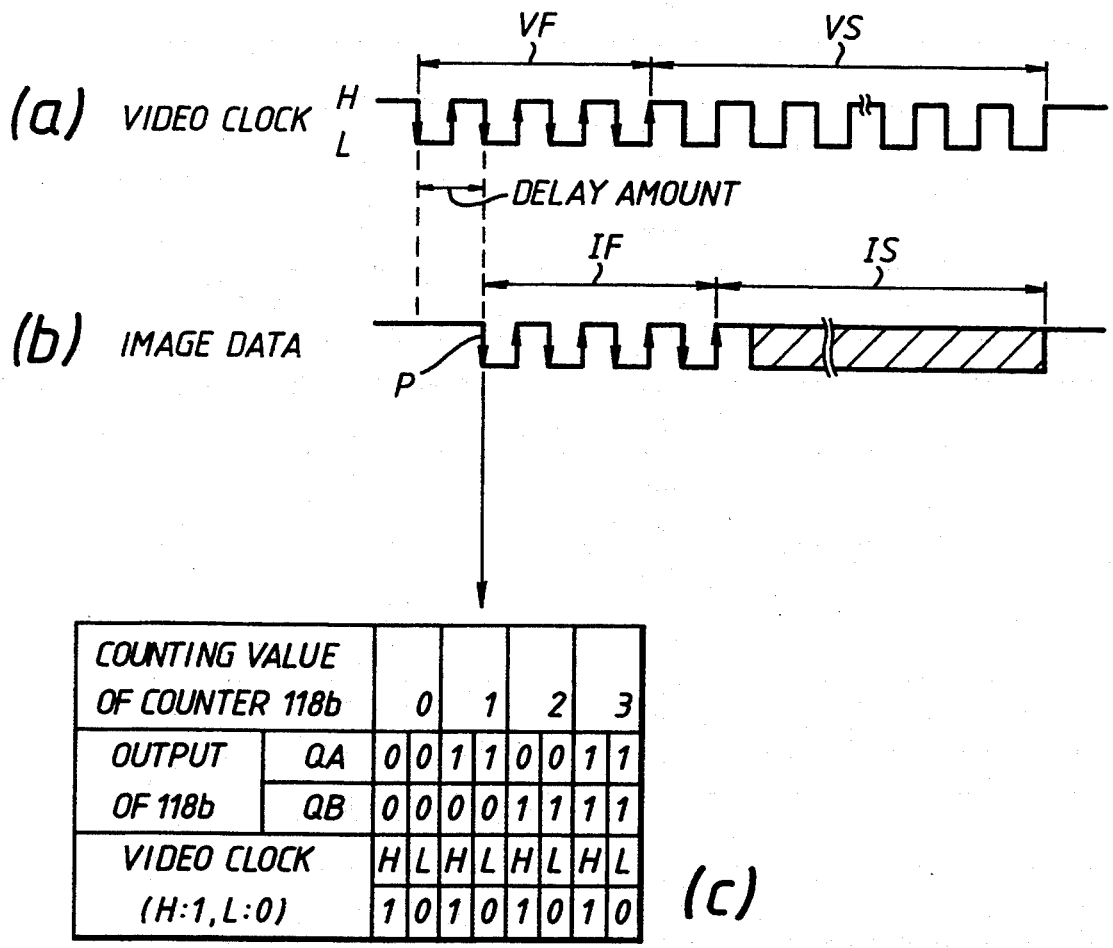
FIG. 20 is a chart for explaining a setting operation of the correcting amount by the phase correcting section of FIG. 19.

As shown in FIGS. 17 to 19, sync circuit 4a is connected to external unit controller 2 and phase correcting section 4c for outputting the video clock. External unit controller 2 is connected to sync circuit 4a and phase correcting section 4c for outputting the image data corresponding to the video clock. Also referring to FIG. 20, the video clock includes a first signal portion VF and a second signal portion VS, and the image data also includes a first signal portion IF and a second signal portion IS.

As shown in FIG. 20(a), first signal portion VF is a predetermined number "n" of video clocks irrespective of a length of the image area information output from image forming information block 101, the second signal portion VS is an alterable number of video clocks, to follow to first signal portion VF, corresponding to the length of the image area information. The number "n" is defined as an integral number of "1" or more and is "4" in this embodiment.

As shown in FIG. 20(b), first signal portion IF corresponds to the first signal portion of the video clock and is the predetermined number "n" of data signal. When first signal portion IF is output, the signal level changes from the high level to the low level. The change of the signal level is used to detect the delay time. Second signal portion IS corresponds to second signal portion VS and includes data to be printed.

In phase correcting section 4c, for example, the delay amount from the receipt of first signal portion VF to the receipt of first signal portion IS one clock and the clock level of the video clock is the low level "L". The receipt of first signal portion IS detected by the change of the signal level as aforementioned. In this case, as shown in FIGS. 20(c) to 20(e), the output from output terminal QB of video clock output counter 118b is "1", the output from output terminal QB is "0", and input terminals DA, DB, and DC are temporarily set to "1", "1", and "0" respectively. Since the first signal portion IF is input to input terminal CK of D type flip-flop circuit 119d in this condition, the setting amount of input terminals DA, DB, and DC are latched and the correcting amount is automatically set to "rise with 1-clock delay".

Additional advantages and modifications will readily occur to those skilled in the art. Therefore, the invention in its broader aspects is not limited to specific details, representative devices, and illustrated examples shown and described herein. Accordingly, various modifications may be made without departing from the spirit or scope of the general inventive concept as defined by the appended claims and their equivalents.

As has been described above in detail, according to the present invention, correction of the delay time of the image data input from the external unit controller is set in units of ½ clocks for an amount corresponding to a phase difference, and the internal video clock for image formation is started with a delay of clocks preset in units of ½ clocks, thereby precisely forming an image.

With above correction, a video clock synchronized with the image data by the controller can be supplied without changing the internal video clock count determined by the image data of one line or adding signal adjusting section.

Additional advantages and modifications will readily occur to those skilled in the art. Therefore, the invention in its broader aspects is not limited to specific details, representative devices, and illustrated examples shown and described herein. Accordingly, various modifications may be made without departing from the spirit or scope of the general inventive concept as defined by the appended claims and their equivalents.

What is claimed is:

1. An image data transmitting/receiving apparatus, comprising:
    means for generating a clock signal;

first means for receiving the clock signal and for sending image data in response to the clock signal;

means for determining a delay amount which occurs in the first means between receiving clock signal and sending the image data;

means for generating a corrected image area signal based on the delay amount; and second means for receiving the clock signal, the image data sent by the first means and the corrected image area signal and for outputting the image data in synchronism with the clock signal.

2. The image data transmitting/receiving apparatus according to claim 1, further comprising means, coupled between the generating means and the first means, for providing to the first means a portion of the clock signal corresponding to an image area of the image data; and wherein the second means includes means, responsive to the corrected image area signal, for extending by the delay amount of the sending of the image data.

3. The image data transmitting/receiving apparatus according to claim 1, wherein the determining means includes means for counting a number of pulses of the clock signal from a start of the clock signal output from the generating means, to a start of the image area of the image data output from the first means.

4. The image data transmitting/receiving apparatus according to claim 3, wherein the counting means includes means for detecting the start of the image area of the image data, and means for latching the counted number of pulses of the clock signal corresponding to the detection of the start of the image area.

5. The image data transmitting/receiving apparatus according to claim 1, further comprising: means for manually setting an arbitrary delay amount, the setting means having an operating portion for operation by an operator; and means for selecting one of the arbitrary delay amount set by the setting means and the delay amount determined by the determining means.

6. An image forming apparatus, comprising:

means for generating a clock signal;

first means for receiving the clock signal and for sending image data in response to the clock signal;

means for determining a delay amount which occurs in the first means between receiving clock signal and sending the image data;

means for generating a corrected image area signal based on the delay amount;

second means for receiving the clock signal, the image data sent by the first means and the corrected image area signal and for outputting the image data in synchronism with the clock signal; and means for forming an image on a image bearing member on a basis of the image data output from the second means.

7. The image forming apparatus according to claim 6, further comprising means, coupled between the generating means and the first means, for providing to the first means a portion of the clock signal corresponding to an image area of the image data; and wherein the second means includes means, responsive to the corrected image area signal, for extending by the delay amount of the sending of the image data.

8. The image forming apparatus according to claim 6, wherein the determining means includes means for counting a number of pulses of the clock signal from a start of the clock signal output from the generating means, to a start of the image area of the image data output from the first means.

9. The image forming apparatus according to claim 8, wherein the counting means includes means for detecting the start of the image area of the image data, and means for latching the counted number of pulses of the clock signal corresponding to the detection of the start of the image area.

10. The image forming apparatus according to claim 9, wherein the forming means includes means for scanning the image in a first direction, and means for relatively moving the image bearing member and the scanning means in a second direction to be perpendicular to the first direction while the scanning means repeats the scanning operation, so as to be a two-dimensional image.

11. The image forming apparatus according to claim 10, wherein the video clock generating means includes video clock forming means for forming the video clock so as to correspond to one scanning length of the scanning means.

12. The image forming apparatus according to claim 11, wherein the determining means includes means for initializing the delay amount every time the scanning means scans the image.

13. The image forming apparatus according to claim 6, further comprising: means for manually setting an arbitrary delay amount, the setting means having an operating portion for operation by an operator; and means for selecting one of the arbitrary delay amount set by the setting means and the delay amount determined by the determining means.

14. An image data transmitting/receiving method, comprising the steps of:

generating a clock signal;

receiving the clock signal;

sending image data in response to the clock signal;

determining a delay amount which occurs between receiving clock signal and sending the image data;

generating a corrected image area signal based on the delay amount;

receiving the clock signal, the image data, and the corrected image area signal; and outputting the image data in synchronism with the clock signal.

* * * * *